(12) United States Patent
Matsuzawa et al.

(10) Patent No.: US 9,641,714 B2
(45) Date of Patent: May 2, 2017

(54) LIGHT GUIDE AND IMAGE READING APPARATUS

(71) Applicant: MITSUBISHI ELECTRIC CORPORATION, Chiyoda-ku (JP)

(72) Inventors: Taku Matsuzawa, Chiyoda-ku (JP); Kosaku Yamagata, Chiyoda-ku (JP); Tadashi Minobe, Chiyoda-ku (JP); Yasuhiro Nakamura, Chiyoda-ku (JP); Hiroyuki Kawano, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 14/766,677

(22) PCT Filed: Feb. 14, 2014

(86) PCT No.: PCT/JP2014/000747
§ 371 (c)(1),
(2) Date: Aug. 7, 2015

(87) PCT Pub. No.: WO2014/129152
PCT Pub. Date: Aug. 28, 2014

(65) Prior Publication Data
US 2016/0014294 A1  Jan. 14, 2016

(30) Foreign Application Priority Data
Feb. 21, 2013  (JP) .................. 2013-032434

(51) Int. Cl.
*H04N 1/04* (2006.01)
*H04N 1/028* (2006.01)
(Continued)

(52) U.S. Cl.
CPC ......... *H04N 1/02855* (2013.01); *G02B 6/001* (2013.01); *G02B 6/0008* (2013.01);
(Continued)

(58) Field of Classification Search
CPC ........... H04N 1/02825; H04N 1/02855; H04N 1/00167; H04N 1/00188; H04N 1/028;
(Continued)

(56) References Cited

U.S. PATENT DOCUMENTS 7,591,576 B2     9/2009  Okamoto et al.
8,167,475 B2 *   5/2012  Katsumata ............. G03B 27/54
                                                         359/515
(Continued)

FOREIGN PATENT DOCUMENTS

JP     2003-046726 A    2/2003
JP     2012-129947 A    7/2012
(Continued)

OTHER PUBLICATIONS

International Search Report issued Apr. 28, 2014 for PCT/JP2014/000747 filed Feb. 14, 2014.

*Primary Examiner* — Cheukfan Lee
(74) *Attorney, Agent, or Firm* — Oblon, McClelland, Maier & Neustadt, L.L.P.

(57) ABSTRACT

A light guide including a light scattering portion that reflects light guided inside the light guide, and a light emitting surface portion emitting light reflected by the light scattering portion to outside the light guide. A light emitting surface portion includes first and second light emitting surface portions, the first light emitting surface portion has a longer circumferential length than that of the second light emitting surface portion in the transversal cross section, and circumference curvature of the first light emitting surface portion in the transversal cross section increases away from the second light emitting surface portion. A normal line to the light scattering portion, passing through the center of the light scattering portion in the transversal cross section, intersects with the first light emitting surface portion, at a point at a
(Continued)

near side to the second light emitting surface portion in the transversal cross section.

6 Claims, 22 Drawing Sheets

(51) Int. Cl.
    *G02B 27/09*     (2006.01)
    *H04N 1/00*     (2006.01)
    *F21V 8/00*     (2006.01)
    *G06K 9/00*     (2006.01)
    *G02B 3/06*     (2006.01)

(52) U.S. Cl.
    CPC ..... *G02B 27/0994* (2013.01); *G06K 9/00087* (2013.01); *H04N 1/00167* (2013.01); *H04N 1/00188* (2013.01); *H04N 1/028* (2013.01); *H04N 1/04* (2013.01); *G02B 3/06* (2013.01); *H04N 2201/03125* (2013.01); *H04N 2201/03137* (2013.01); *H04N 2201/03145* (2013.01)

(58) Field of Classification Search
    CPC ........... H04N 1/04; H04N 2201/03125; H04N 2201/03137; H04N 2201/03145; G02B 6/0008; G02B 6/001; G02B 27/0994; G02B 3/06; G06K 9/00087
    See application file for complete search history.

(56) References Cited

U.S. PATENT DOCUMENTS

| | | |
|---|---|---|
| 2006/0152805 A1 | 7/2006 | Ikeda et al. |
| 2011/0299138 A1* | 12/2011 | Minamikawa ..... H04N 1/02825 358/474 |
| 2012/0154877 A1 | 6/2012 | Kisara et al. |
| 2014/0139893 A1* | 5/2014 | Sugiyama .......... H04N 1/02835 358/475 |
| 2015/0316706 A1* | 11/2015 | Fujiuchi ............ H04N 1/02835 358/482 |

FOREIGN PATENT DOCUMENTS

| | | |
|---|---|---|
| JP | 2013-081075 A | 5/2013 |
| WO | 2005/001529 A1 | 1/2005 |
| WO | 2006/049206 A1 | 5/2006 |

\* cited by examiner

LIGHT GUIDE AND IMAGE READING APPARATUS

TECHNICAL FIELD

The present disclosure relates both to an image reading apparatus that acquires an image of a reading target and to a light guide employed in the image reading apparatus, and the light guide is employed for linearly irradiating the reading target in the image reading apparatus with light.

BACKGROUND ART

An image reading apparatus has long been employed in such devices as a fax machine, a copy machine, a scanner, a bill discriminating device, a testing device, and a fingerprint authentication device. Reading targets by the image reading apparatus cover a wide variety of items such as a manuscript, a book, a page of a magazine, a document, a picture, a photograph, a slide film, a film, a banknote, a bond, a board, an electronic component, and a fingerprint. The image reading apparatus obtains an image of a reading target in such a way that a photodetector (sensing element) receives reflected light from the reading target. Depending on the property of the reading target and the purpose of the reading, there may be a case where reflected light received by a photodetector is light having wavelengths not only of visible light, but also of non-visible light. Thus, in a light source installed inside or outside the image reading apparatus, that is, in the light source (illuminating device) that irradiates the reading target with light in order to receive reflected light from the reading target, a light source element that not only emits visual light but also emits light having wavelengths other than that of visual light may be used in some cases. As the light source element for the light source (illuminating device), a light source element (point light source) such as an LED (Light Emitting Diode) or organic EL (Electro Luminescence) is frequently used.

In general, a direction to which a reading target is fed is referred to as a sub-scanning direction (feed direction) of the image reading apparatus. A direction that intersects with (that is frequently orthogonal to) the sub-scanning direction is referred to as a main scanning direction of the image reading apparatus. Photodetectors in the image reading apparatus are disposed frequently along the main scanning direction. A reading depth direction (depthwise direction) of the image reading apparatus is a direction that intersect with (that is frequently orthogonal to) the main scanning direction and the sub-scanning direction. Further, regarding a light source used in the image reading apparatus, in a case where light from a light source element is guided in a light guide and then a reading target is irradiated with the light and also the light guide is extending rod-shaped, the relation between a longitudinal direction and a transversal direction in the light guide is defined as follows. The longitudinal direction in the light guide corresponds to the main scanning direction in the image reading apparatus and the transversal direction in the light guide corresponds to the sub-scanning direction in the image reading apparatus.

A configuration of the light source in which light emitted from a light source element is guided in a light guide and then a reading target is irradiated with the light is as follows. The light guide used in the image reading apparatus includes a light scattering area (light scattering portion) that extends along the longitudinal direction and a light emitting surface portion in a surface opposite to the light scattering area. In such a light guide described above, incident light from an end portion in the longitudinal direction propagates in the longitudinal direction and is scatteringly reflected in the light scattering area, and linearly radiated light is emitted from the light emitting surface portion opposite to the light scattering area so as to irradiate a reading area (for example, refer to Patent documents 1 to 6). Note that the reading area is an irradiated portion on a reading surface, irradiated with light from the light source.

In addition, as a light guide used for an image reading apparatus, there also exists a light guide in which, without the use of the light scattering area (light scattering portion), light emitted from a plurality of light source elements (point light sources) disposed in the longitudinal direction is transmitted, and linearly radiated light is emitted from the light emitting surface portion so as to irradiate the reading area (for example, refer to Patent documents 7)

PRIOR ART DOCUMENT

Patent Document

Patent Document 1: Japanese Unexamined Patent Publication No. 2003-46726 (particularly, refer to FIG. 4)
Patent Document 2: International Patent Publication WO2005/001529 (particularly, refer to FIG. 1)
Patent Document 3: International Patent Publication WO2006/049206 (particularly, refer to FIG. 3)
Patent Document 4: Japanese Unexamined Patent Publication No. 2009-75184 (particularly, refer to FIG. 1)
Patent Document 5: Japanese Unexamined Patent Publication No. 2010-277940 (particularly, refer to FIGS. 11 and 12)
Patent Document 6: Japanese Unexamined Patent Publication No. 2002-232648 (particularly, refer to FIG. 3)
Patent Document 7: Japanese Unexamined Patent Publication No. 2006-67551 (particularly, refer to FIG. 18)

SUMMARY OF THE INVENTION

Problems to be Solved by the Invention

In the invention disclosed in Patent document 1, widening light emitting surface (light emitting surface portion) of the light guide makes radiated light to be wide in the transversal direction, so that an illuminance variation caused by a variation in a position of the reading target in the reading depth direction (depthwise direction) is suppressed. In the invention disclosed in Patent document 2, a side surface of the light guide is configured with two types of curved surfaces having different shapes, and thus a light focusing position is displaced into two positions each of which corresponds to the respective curved surfaces, so that an illuminance variation caused by a variation in the position of the reading target in the reading depth direction (depthwise direction) is suppressed. Note that, the position of the reading target means a position in the reading depth direction (depthwise direction) of a reading area in a fed reading target.

In the invention disclosed in Patent documents 3 to 6, light is collected by making the light emitting surface (light emitting surface portion) of the light guide circular or elliptical. In the invention disclosed in Patent 7, illuminance in the sub-scanning direction (transversal direction) is ensured by configuring the light emitting surface (light emitting surface portion) of the light guide with two planar surfaces having different angles.

In an image reading apparatus, if the reading target is a book document such as a book or a magazine in which a plurality of sheets of paper is bound, and one side of which is fixed together, the image of a valley side of the opened book document, that is, the inner side of the book document is read as a reading surface, and thus the reading surface is not flat. Similarly, when the reading target such as a banknote having a surface asperity is read, the reading surface is not flat. That is, unevenness exists in the reading surface of the reading target such as a book document or a banknote. In an image reading apparatus, since light from a light source is obliquely radiated in order to receive reflected light, a contrast difference of the read image occurs owing to the unevenness of the reading surface.

In an image reading apparatus, in order to suppress the contrast difference due to the unevenness of the reading surface, it is preferable to use a light source that can radiate light having high illuminance uniformity with respect to the distance (depth) between cover glass on which the reading target is placed or passes by and the position of the reading target. Note that, the illuminance uniformity with respect to the distance (depth) between the cover glass and the position of the reading target means the illuminance uniformity in the reading depth direction (depthwise direction).

The direction with respect to the distance (depth) between the cover glass and the position of the reading target corresponds to the above reading depth direction (depthwise direction), which is often a direction along which a light axis of an imaging optical system in the image reading apparatus extends. In an image reading apparatus in which the light axis in an imaging optical system is bent by reflection using optical components such as mirrors, a light axis between the reading target and a first optical component extends along the reading depth direction.

Further, in a case where the light axis of the imaging optical system in the image reading apparatus is shifted to the sub-scanning direction (transversal direction), it is preferable that the illuminance uniformity in the sub-scanning direction is also high. Similarly, in a case where sensors in the image reading apparatus are divided and disposed in two lines or more and respective reading areas are spaced in the sub-scanning direction (transversal direction), it is preferable that the illuminance uniformity in the sub-scanning direction is also high.

In the image reading apparatus having a configuration disclosed in Patent document 1, the light emitting surface is broadened so as for the radiated light to be wide in the transversal direction, so that the illuminance uniformity in the reading depth direction and the sub-scanning direction (transversal direction) is enhanced. However, since the radiated light diffuses extensively, there has been a problem of reduction in the illuminance in the reading area. In the image reading apparatus having a configuration disclosed in Patent document 2, light reflected by two types of curved surface is emitted so as for the light focusing position to be displaced into two positions in the reading depth direction (depthwise direction), so that illumination having high illuminance and high illuminance uniformity in the reading depth direction (depthwise direction) can be realized. However, there has been a problem in that the illuminance uniformity in the sub-scanning direction (transversal direction) is not considered.

In the image reading apparatus having a configuration disclosed in Patent documents 3 to 6, a light emitting surface (light emitting surface portion) of the light guide is formed to be circular or elliptical, so that light can be collected in the sub-scanning direction (transversal direction) and high illuminance can be obtained. However, there has been a problem in that the illuminance uniformity in the reading depth direction is not considered. In the image reading apparatus having a configuration disclosed in Patent document 7, illuminance is ensured by configuring the light emitting surface (light emitting surface portion) of a light guide with two planar surfaces having different angles. However, since the radiated light is not collected but is diffused by the planar surfaces, there has been a problem in that the illuminance is reduced.

An object of the present disclosure is to provide a light guide which has high illuminance uniformity in the reading depth direction (depthwise direction) and the transversal direction and by which radiated light keeping high illuminance can be realized, and an image reading apparatus using the light guide.

Means for Solving the Problems

According to the disclosure, a light guide extending along a longitudinal direction and having an arc-like outer shape portion at least in a part of a transversal cross section being a cross section along a transversal direction that intersects with the longitudinal direction, includes; a light scattering portion formed on a side surface of the light guide along the longitudinal direction and for reflecting light guided inside the light guide; and a light emitting surface portion including at least a part of the outer shape portion and formed on a side surface along the longitudinal direction located opposite to the light scattering portion, and for emitting light reflected by the light scattering portion to the outside of the light guide. The light emitting surface portion is configured with a first light emitting surface portion and a second light emitting surface portion that are continuous, the first light emitting surface portion has a longer circumferential length than that of the second light emitting surface portion in the transversal cross section, and the curvature of the circumference of the first light emitting surface portion in the transversal cross section becomes larger as getting away from the second light emitting surface portion. A normal line to the light scattering portion, passing through a center of the light scattering portion in the transversal cross section, is arranged so as to intersect with the first light emitting surface portion, and a point where the normal line intersects with the first light emitting surface portion is arranged in the circumference of the first light emitting surface portion at a near side to the second light emitting surface portion in the transversal cross section.

Effect of the Invention

According to the disclosure, light with high luminous flux density is emitted from the light emitting surface portion and the emitted light is collected in the reading area of the reading target, and thus the effect is such that illuminance distribution is uniform in the transversal direction, illuminance is kept high, and illumination light with a small variation in illuminance in the depthwise direction can be obtained.

EMBODIMENT FOR CARRYING OUT THE INVENTION

Embodiment 1

Figure 1:
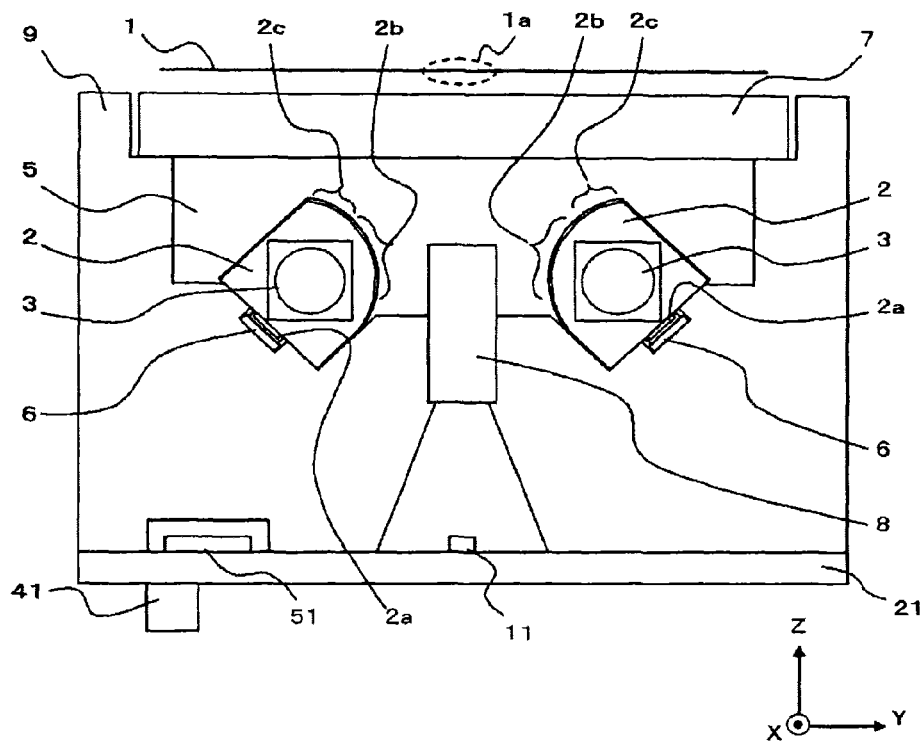
FIG. 1 is a cross sectional view taken along a transversal direction in a light guide and an image reading apparatus according to Embodiment 1 of the present disclosure.

A light guide and an image reading apparatus according to Embodiment 1 of the present disclosure will be described using FIGS. 1 to 15. In the figures, the same or corresponding constituent elements are denoted by the same reference numerals, and the descriptions thereof are omitted. Note that, a direction to which a reading target 1 is fed is referred to as a sub-scanning direction (feed direction) of the image reading apparatus. A direction that intersects with or is perpendicular to the sub-scanning direction is referred to as a main scanning direction of the image reading apparatus. The relation between the light guide (light guide 2) and the image reading apparatus according to Embodiment 1 is as follows. The image reading apparatus according to Embodiment 1 is configured in such a way that an irradiated portion 1a which extends along the main scanning direction of the reading target 1 and corresponds to a reading area of a reading surface is irradiated with linear light emitted from the light guide 2, and the light emitted from the light guide 2 (illumination light) is reflected by the reading target 1 and converged, and the converged light is received. In the present disclosure, an example is illustrated in which the main scanning direction is perpendicular to the sub-scanning direction. Note that, the irradiated portion 1a is schematically shown in the figures as a portion encircled by a dotted line.

Further, a reading depth direction (depthwise direction) of the image reading apparatus according to Embodiment 1 is a direction that intersects with or that is perpendicular to the main scanning direction and the sub-scanning direction. In the present disclosure, an example is illustrated in which the reading depth direction is perpendicular to the main scanning direction and the sub-scanning direction. The reading depth direction is often a direction along which a light axis of an imaging optical system 8 in the image reading apparatus extends. In a case where the light axis in the imaging optical system 8 is bent by reflection using optical components such as mirrors, a light axis between the reading target 1 and a first optical component extends along the reading depth direction.

In the present disclosure, a linear imaging optical system 8 in which a plurality of optical components of the imaging optical system such as lenses are disposed in an array format, and a linear optical receiver 11 (sensor IC 11) in which a plurality of photodetectors are disposed in an array format, are taken as an example and used for explanation. Thus, the main scanning direction is a direction along which the imaging optical system 8 and the optical receiver 11 extend. The optical receiver 11 (sensor IC 11) receives light converged in the imaging optical system 8. In the figures, the main scanning direction (longitudinal direction) is denoted as the X-axis direction, the sub-scanning direction (transversal direction) is denoted as the Y-axis direction, and the reading depth direction (depthwise direction) is denoted as the Z-axis direction. The X-axis, the Y-axis, and the Z-axis define a three-dimensional orthogonal coordinate system.

The relation between the light guide (light guide 2) according to Embodiment 1 and the image reading apparatus according to Embodiment 1 will be further described in detail. The light guide 2 is a rod-shaped member extending along the longitudinal direction and composed of a transparent resin such as acrylic or polycarbonate. The light guide 2 is installed inside the image reading apparatus or disposed outside the image reading apparatus. As an example of the image reading apparatus shown in the present disclosure, the two light guides 2 between which the imaging optical system 8 is interposed are disposed in the sub-scanning direction, whereas the light guide 2 may be single.

Light emitted from a light source element 3 is guided inside the light guide 2, and then emitted from a side surface that extends along the longitudinal direction, so that the irradiated portion 1a extending along the main scanning direction of the reading target 1 is irradiated with linear light. Thus, the longitudinal direction in the light guide 2 corresponds to the main scanning direction in the image reading apparatus and the transversal direction in the light guide 2 corresponds to the sub-scanning direction in the image reading apparatus. Within the side surfaces extending along the longitudinal direction of the light guide 2, a surface from which effective light as illumination light is emitted is referred to as a light emitting surface portion. Since the reading target 1 is fed along the feed direction (sub-scanning direction), the irradiated portion 1a in the reading target 1 sequentially moves on the reading target 1 as the fed reading target 1 moves.

Figure 2:
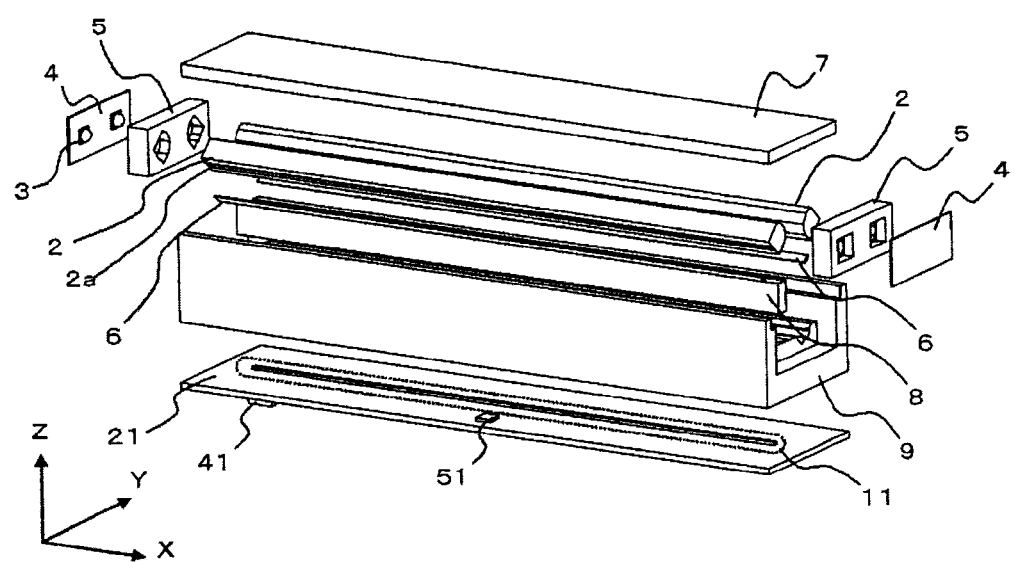
FIG. 2 is an exploded perspective view of the light guide and the image reading apparatus according to Embodiment 1 of the present disclosure.
Figure 3:
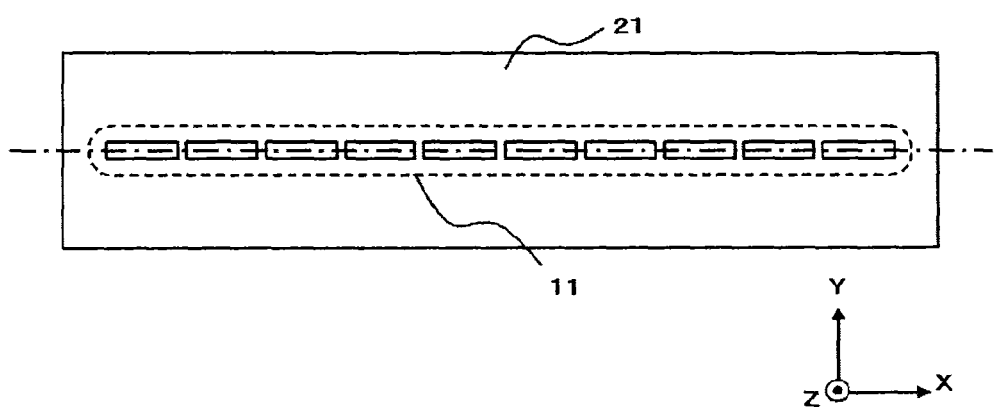
FIG. 3 is a diagram showing an arrangement of a sensor IC in an image reading apparatus according to Embodiment 1 of the present disclosure.

FIG. 1 is a cross sectional view taken along the transversal direction in the image reading apparatus including the light guide according to Embodiment 1. The transversal direction (Y-axis direction) corresponds to the horizontal direction in FIG. 1. The longitudinal direction (X-axis direction) corresponds to the depth direction of FIG. 1. As previously described, the dispose direction of the sensor IC 11 is the longitudinal direction (main scanning direction). The reading depth direction, that is, the depthwise direction (Z-axis direction) is the vertical direction in FIG. 1 and corresponds to the direction with respect to the distance between the reading target 1 and a transparent plate 7 (cover glass 7). Note that, FIG. 2 is an exploded perspective view of the image reading apparatus including the light guide according to Embodiment 1, and FIG. 3 is a diagram showing an arrangement of a sensor IC 11 in the image reading apparatus including the light guide according to Embodiment 1.

The image reading apparatus according to the present disclosure will be explained using a configuration in which the light guide 2, the imaging optical system 8, and the sensor IC 11 (later-described sensor IC 11od and sensor IC 11ev are included) are included. The light guide 2 is used to irradiate the irradiated portion 1a of the reading target 1. The imaging optical system 8 converges the scattered light (reflected light) that is the light from the light guide 2 and reflected by the irradiated portion 1a of the reading target 1. The sensor IC 11 receives the light converged in the imaging optical system 8. As a matter of course, the light guide (light guide 2) according to the present disclosure may be disposed outside the image reading apparatus.

The reading targets 1 are mediums to be read (objects to be irradiated) having picture information (image information) such as a manuscript, a book, a page of a magazine, a document, a picture, a photograph, a slide film, a film, a banknote, a bond, a board, an electronic component, a fingerprint, and other general documents. Reading of the reading target 1 is carried out in such a way that the irradiated portion 1a is moved in the sub-scanning direction by feeding the reading target 1 in the transversal direction while fixing the image reading apparatus or by moving the image reading apparatus in the sub-scanning direction while fixing the reading target 1, or the like. For more detail, there is a case where the reading target 1 is fed on the transparent plate 7 by a feeding member not shown and a linear image of the area corresponding to the irradiated portion 1a is sequentially read by the image reading apparatus, and there is another case where the reading target 1 is placed on the transparent plate 7 and a linear image of the area corresponding to the irradiated portion 1a is sequentially read by the image reading apparatus by the move of image reading apparatus itself in the feeding direction. In either case, the transparent plate 7 may be separated from the image reading apparatus. Note that, in a case where the reading target 1 is fed by the feeding member whose illustration is omitted, there exists an image reading apparatus which does not have to install the transparent plate 7.

The light guide 2 has an arc-like outer shape portion at least in a part of the transversal cross section (cross section in transversal direction) that is a cross section taken along the transversal direction intersecting the longitudinal direction. Further, in the light guide 2, a light scattering portion 2a and a light emitting surface portion are formed. That is, the light scattering portion 2a that extends along the longitudinal direction is provided on a side surface of the light guide 2 and the light emitting surface portion is provided on the surface opposite to the light scattering portion 2a. For more detail, the light scattering portion 2a is formed on the side surface extending along the longitudinal direction in the light guide 2 and reflects the light that is guided through the interior of the light guide 2. The light emitting surface portion includes at least a part of the outer shape portion of the light guide 2, formed on a side surface extending along the longitudinal direction at the position opposite to the light scattering portion 2a, and emits the light that is reflected by the light scattering portion 2a, to the outside of the light guide 2.

The light source element 3 is a light emitting element (point light source) such as an LED or organic EL, and one or more light source elements are mounted on a circuit board 4 and installed so as to face the end surface of the light guide 2 in the longitudinal direction (end surface along the transversal direction) by use of a holder 5. The light guide 2, the light source element 3, the circuit board 4, and the holder 5 may be referred to as a light source of the image reading apparatus (illuminating device), or the light guide 2 and the light source element 3 may be referred to as the light source of the image reading apparatus (illuminating device).

The detail of the image reading apparatus (illuminating device) according to Embodiment 1 is as follows. Holes are formed in the flat holder 5 and the end portion of the light guide 2 in the longitudinal direction is inserted into the hole. In the holder 5, the circuit board 4 is disposed opposite to the side to which the light guide 2 is inserted and the light source element 3 is disposed on the circuit board 4 at the position corresponding to the hole to which the light guide 2 is inserted, and thereby the light from the light source element 3 enters the light guide 2. In addition, the light source element 3 may be inserted to the hole of the holder 5, or the circuit board 4 besides the light source element 3 may be inserted to the hole of the holder 5. Note that, a stepped portion is provided in the inside of holder 5, and the stepped portion may be used as a structure for locking the light guide 2. The end portion of the light guide 2 caught by the stepped portion formed inside the holder 5 does not protrude into the inside of holder 5 beyond the stepped portion, and thereby the distance between the light source element 3 and the end portion of light guide 2 can be properly maintained. With the stepped portion provided, an optical filter can also be easily disposed between the light source element 3 and the end portion of the light guide 2.

The light emitting surface portion of light guide 2 is configured with a first light emitting surface portion 2b and a second light emitting surface portion 2c that are continuous. Regarding these first light emitting surface portion 2b and second light emitting surface portion 2c, the first light emitting surface portion 2b has a longer circumferential length than that of the second light emitting surface portion 2c in the transversal cross section being the cross section along the transversal direction, and the curvature of the circumference of the first light emitting surface portion 2b in the transversal cross section being the cross section along the transversal direction becomes larger as getting away from the second light emitting surface portion 2c. Note that the second light emitting surface portion 2c is disposed so as to face the side of the reading target 1 (irradiated portion 1a).

In the light guide 2, the light scattering portion 2a is formed at a position over the main scanning direction so as for the relation between the normal line NL to the light scattering portion 2a and the first light emitting surface portion 2b to be as follows. The normal line NL to the light scattering portion 2a, passing through the center of the light scattering portion 2a in the transversal cross section being the cross section along the transversal direction, intersects with the first light emitting surface portion 2b. The point where the normal line NL intersects with the first light emitting surface portion 2b is arranged in the circumference of the first light emitting surface portion 2b at a near side to the second light emitting surface portion 2c in the transversal cross section being the cross section along the transversal direction. Note that the light scattering portion 2a may be a prism (corresponding to later-described "light scattering prism 101") that is composed of unevenness formed on the side surface of the light guide 2, or it may be such that paint having a color with high reflectance, such as a white color, is applied to or printed on the side surface of the light guide 2 or a tape having a color with high reflectance, such as a white color, is pasted to the side surface of the light guide 2. Further, in order to obtain uniform illuminance on the irradiated portion 1a in the main scanning direction (longitudinal direction), as the distance from the light source elements 3 increases, a pattern in the light scattering portion 2a is made gradually denser or the width of the pattern is made wider, or the both may be adopted.

A reflector 6 extending along the main scanning direction is disposed outside the light guide 2 and at a position facing the light scattering portion 2a of the light guide 2, and composed of a material with high reflectance, such as a white resin, a white tape, and an aluminum tape. In a case where the light scattering portion 2a of the light guide 2 is composed of the prism, the reflector 6 reflects light passing through the light scattering portion 2a and makes the reflected light reenter the light guide 2. Even in a case where the light scattering portion 2a is formed by coating, printing, or pasting, etc., the reflector 6 may be formed for making leakage light from the periphery of the light scattering portion 2a reenter the light guide 2. Note that, in a case where there is no need to make the light passing through the light scattering portion 2a and the light passing through the vicinity of light scattering portion 2a reenter the light guide 2 or there is little light passing through the light guide 2, the reflector 6 is not necessary. In the present disclosure, except for FIG. 8(c) described later, an image reading apparatus that needs the reflector 6 will be described exemplarily.

The transparent plate 7 is such that light emitted from the light guide 2 passes through it and the reading target 1 is irradiated, and also the light reflected by the reading target 1 passes through it and the reflected light enters the imaging optical system 8. The transparent plate 7 is made of a transparent glass etc., or a transparent resin such as an acryl or a polycarbonate. In addition, in a system of the image reading apparatus in which the reading target 1 is fed, the transparent plate 7 (cover glass 7) often forms a part of a feed path of the reading target 1.

In a case where the reading target 1 is fed in contact with the transparent plate 7, the focal point of the imaging optical system 8 is set to a vicinity of the surface where the reading target 1 makes contact with the transparent plate 7. That is, in the vicinity of the surface where the reading target 1 makes contact with the transparent plate 7, the irradiated portion 1a corresponds to the portion where the optical axis of the imaging optical system 8 intersects with the transparent plate 7. Meanwhile, in a case where the transparent plate 7 does not make contact with the reading target 1 as shown in FIG. 1, the portion where the optical axis of the imaging optical system 8 intersects with the reading target 1 corresponds to the irradiated portion 1a. Naturally, in a case where the reading target 1 is fed in contact with the transparent plate 7, the portion where the optical axis of the imaging optical system 8 intersects with the reading target 1 also corresponds to the irradiated portion 1a.

The imaging optical system 8 is such that it collects (converges) the light reflected by the reading target 1 in the irradiated portion 1a of the reading target 1. In the image reading apparatus shown in FIGS. 1 and 2, the imaging optical system 8 where an erecting equal-magnification optical system such as rod lens array or microlens array is adopted is exemplarily described. The rod lens array (microlens) is disposed along the main scanning direction. Thus the imaging optical system 8 is a linear rod lens array 8 (microlens array 8) where a plurality of rod lenses (microlenses) are disposed in an array format, or an erecting equal-magnification optical system 8.

The sensor IC 11 receives the light collected (converged) by the imaging optical system 8 and outputs an electrical signal obtained by photoelectrically converting the light. As shown in FIG. 3, photodetectors are linearly disposed in the longitudinal direction on a sensor board 21 so as to have their length equal to or larger than an effective reading length of the image reading apparatus. In FIG. 3, the dashed-dotted line indicates that the disposed direction of the photodetectors is the X axis direction (longitudinal direction). A signal processing IC 51 performs signal processing of an electrical signal output from the sensor IC 11, and an IC (integrated circuit) that performs signal processing in conjunction with a CPU and a RAM. The signal processing IC 51 is composed of integrated circuits or the like such as an ASIC (Application Specific Integrated Circuit) and a FPGA (Field-Programmable Gate Array). The signal processing IC 51 is disposed on the sensor board 21 along with other components. An external connector 41 is used for an interface of input/output signals including a signal processing output of the signal processing IC 51.

A housing 9 houses or holds the light guide 2, the light source element 3, the circuit board 4, the holder 5, the reflector 6, the imaging optical system 8, and the sensor board 21. The housing 9 is composed of a metal or a resin at least a part of which has light shielding property, or the like. The reflector 6 may be formed on the side of the housing 9 or the side of the light guide 2. That is, there is no limitation as long as leakage light from the light guide 2 can be returned to the light guide 2. As a matter of course, the reflector 6 is not necessarily required. Further, in a case where the transparent plate 7 is installed in the image reading apparatus, one example is that the housing 9 supports the transparent plate 7. In the case of the example, the space inside the housing 9 holding the imaging optical system 8 may be sealed with the transparent plate 7. Note that, in the exploded perspective view of the image reading apparatus shown in FIG. 2, although it is configured such that the holders 5 take on a role in sealing the end portions along the sub-scanning direction (Y axis direction) in the image reading apparatus, the configuration is not limited to this.

Next, operation of the image reading apparatus according to Embodiment 1 will be described. Light emitted from the light source element 3 enters the light guide 2 through the end portion in the longitudinal direction of the light guide 2 (the end surface along the transversal direction). The light that enters the light guide 2 propagates inside the light guide 2 in the longitudinal direction and is reflected and scattered when the light strikes the light scattering portion 2a, and then part of the light is emitted from the first light emitting surface portion 2b or the second light emitting surface portion 2c. The light emitted from the first light emitting surface portion 2b or the second light emitting surface portion 2c passes through the transparent plate 7 so as to irradiate the reading target 1, and is reflected on the reading target 1 in the irradiated portion 1a of the reading target 1. Scattered light that is reflected (reflected light) passes through the transparent plate 7, and is collected (converged) in the imaging optical system 8 and then received by the sensor IC 11 to be externally outputted as an electrical signal after photoelectric conversion.

Figure 4:
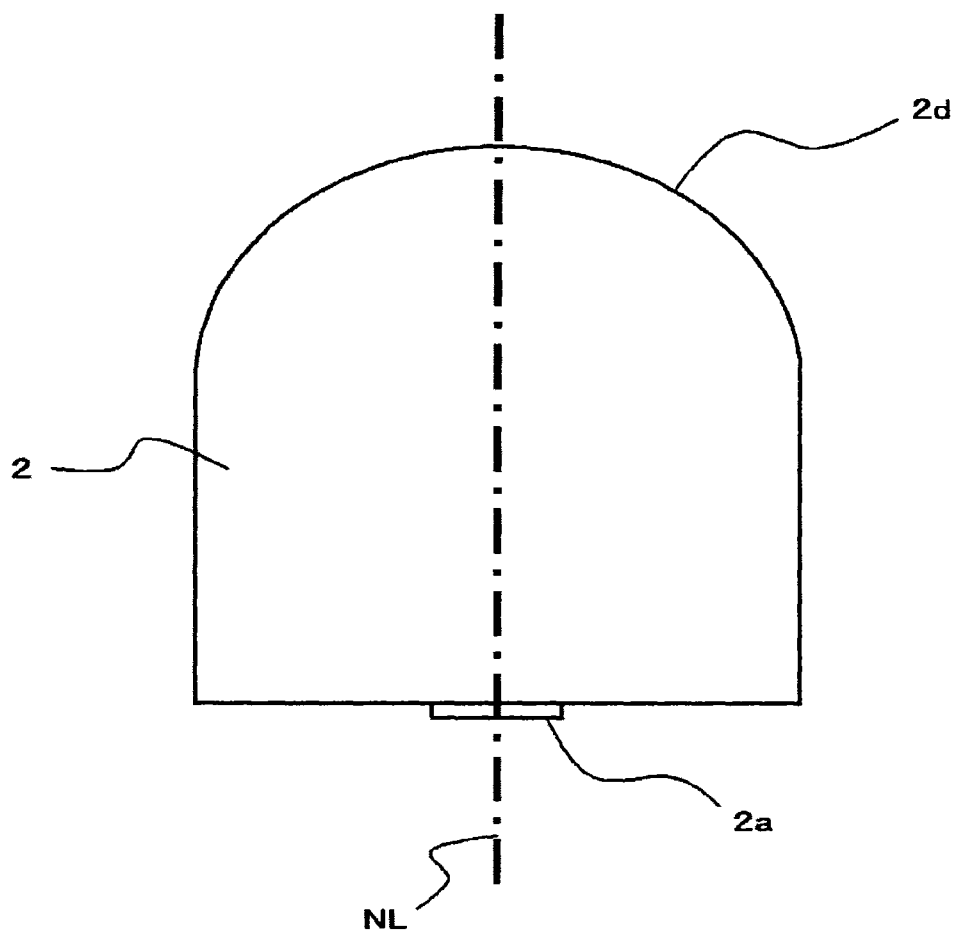
FIG. 4 is a cross sectional view taken along a transversal direction in a comparative example for the light guide according to Embodiment 1 of the present disclosure.
Figure 5A:
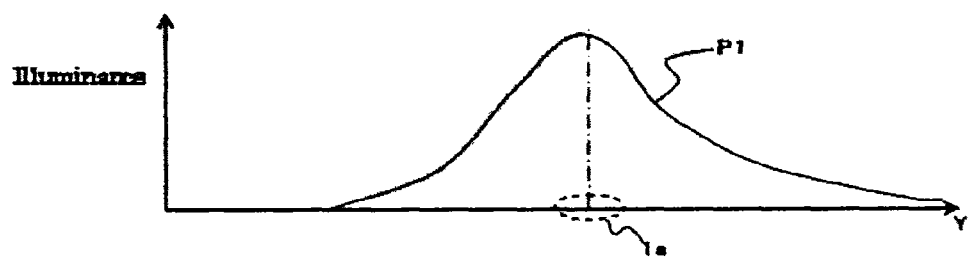
FIGS. 5A, 5B are diagrams showing illuminance distribution and light emitting paths in a comparative example for the light guide according to Embodiment 1 of the present disclosure.
Figure 5B:
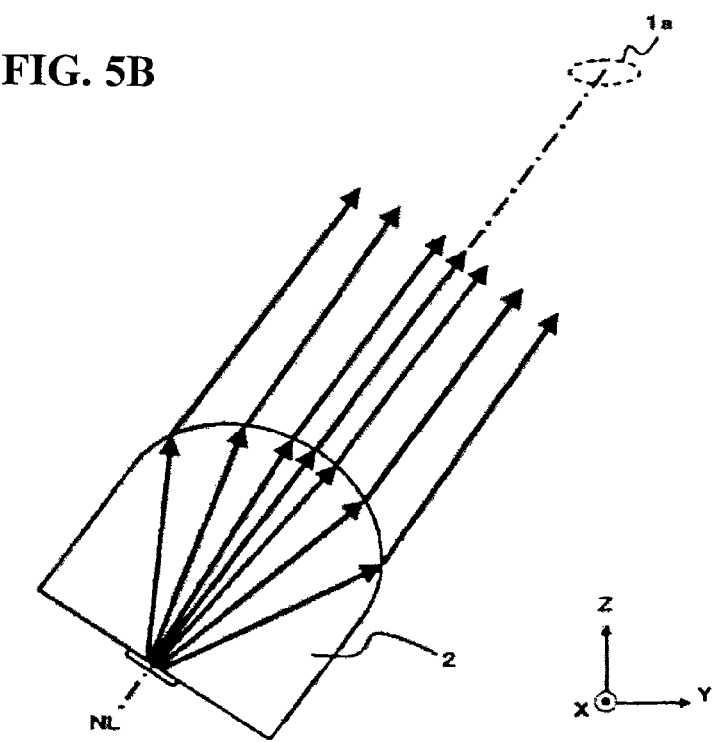

FIG. 4 is a transversal cross section along the transversal direction of a light guide 2 in a comparative example including an arc-shaped light emitting surface portion 2d. FIG. 5A is a diagram showing illuminance distribution in the transversal direction of the light guide 2 in the comparative example in which the light emitting surface is constituted with a curved surface. FIG. 5B is a diagram showing light emitting paths of the light guide 2 in the comparative example in which the light emitting surface is constituted with the curved surface. In the distribution diagram shown in FIG. 5A, the vertical axis shows illuminance. The horizontal axis shows illuminance distribution in the Y axis direction (sub-scanning direction). The position where Y axis direction intersects with the dashed-dotted line is around the center of the irradiated portion 1a. At the position where the line P1 indicating the distribution intersects with the dashed-dotted line in FIG. 5A, the illuminance is highest. The dashed-dotted line shown in FIG. 5A corresponds to the optical axis of the imaging optical system 8.

The light guide 2 in the comparative example has a configuration similar to those in Patent Documents 3 through 6 disclosed as "the light emitting surface of a light guide is made to be circular or elliptical to collect light". In FIGS. 4 and 5B, a normal line NL to the light scattering portion 2a, which passes through the center of the light scattering portion 2a in the transversal cross section being the cross section along the transversal direction, is indicated by the dashed-dotted line. The normal line NL in the transversal cross section being the cross section along the transversal direction passes through the center of the light emitting surface portion 2d of the light guide 2 in the comparative example. In addition, the light guide 2 in the comparative example has a line-symmetric shape with respect to the normal line NL as an axis in the transversal cross section being the cross section along the transversal direction. FIGS. 5A, 5B can be seen as a schematic diagram if the Y axis of FIG. 5A is seen as the feed path of the reading target 1 and if the center of the irradiated portion 1a is supposed to be on the extended line of the normal line NL of FIG. 5B. The normal line NL of FIG. 5B is inclined with respect to the reading target 1 not shown. That is, the normal line NL of FIG. 5(*b*) is inclined with respect to the Y axis direction.

The light guide 2 in the comparative example shown in FIGS. 4 and 5B has an arc-like outer shape portion that extends along the longitudinal direction and that is in the transversal cross section being the cross section along the transversal direction that intersects with the longitudinal direction. Further, the light guide 2 in the comparative example includes the light scattering portion 2a that is formed on the side surface along the longitudinal direction and reflects the light guided internally, and includes the light emitting surface portion 2d that is formed on the side surface along the longitudinal direction and located opposite to the light scattering portion 2a, and that externally emits the light reflected by the light scattering portion 2a.

In the light guide 2 in the comparative example, light emitted nearly parallel to the normal line NL can be obtained by adjusting the shape of the light emitting surface portion 2d as shown in FIG. 5B. However, the light reflected and scattered by the light scattering portion 2a is scattered with non-uniform intensity in all directions, and a ratio of light that is reflected at a small angle with respect to the normal line NL of the light scattering portion 2a is large. Thus, as shown in FIG. 5A, the illuminance distribution results in a convex distribution having an illuminance peak on the extended line of the normal line NL of the light guide 2 in the comparative example. Further, as described in the description for FIG. 5B, the normal line NL is inclined. Thus, regarding a ray of light from the light guide 2 in the comparative example, the distance to the irradiated surface is larger as the distance at the right side from the dashed-dotted line shown in the distribution diagram FIG. 5B is larger, so that the emitted light tends to expand and the illuminance distribution range is broad at the right side. Therefore, in the light guide 2 in the comparative example, a uniform illuminance distribution cannot be obtained throughout the range comparable to the width in the transversal direction of the light guide 2 in the comparative example, and illuminance uniformity in the reading depth direction (depthwise direction) is low.

Figure 6:
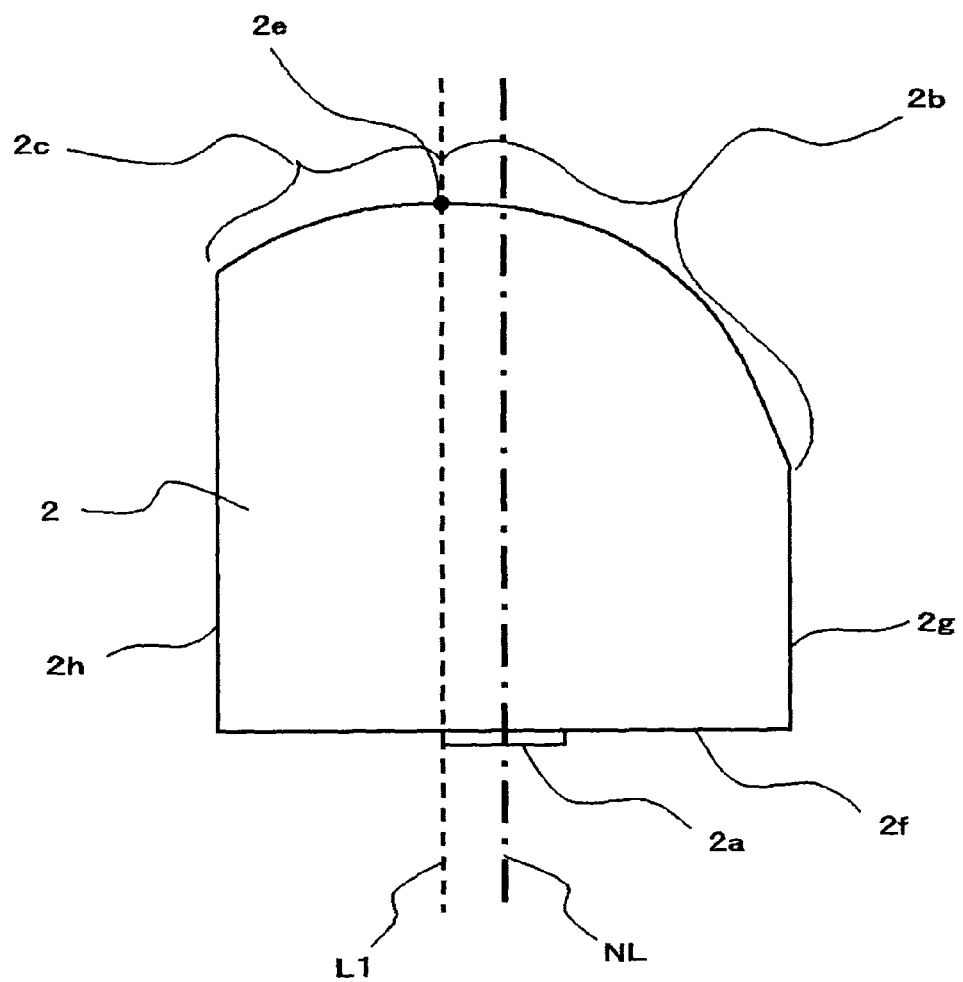
FIG. 6 is a cross sectional view taken along the transversal direction in the light guide according to Embodiment 1 of the present disclosure.

FIG. 6 is a transversal cross section along the transversal direction in the light guide according to Embodiment 1. A light guide 2 shown in FIG. 6 only shows the light guide 2 in the image reading apparatus shown in FIGS. 1 and 2. In FIG. 6, and FIG. 7B described later, a normal line NL to the light scattering portion 2a, which passes through the center of the light scattering portion 2a in the transversal cross section being the cross section along the transversal direction, is indicated by the dashed-dotted line. The light guide 2 includes a planar portion 2f having the light scattering portion 2a that extends along the longitudinal direction, and the light emitting surface portion (first light emitting surface portion 2b and second light emitting surface portion 2c) that is provided at a side opposite to the planar portion 2f. For more detail, the light scattering portion 2a is formed on the planar portion 2f that is flat and provided in the side surface of the light guide 2 along the longitudinal direction. In the transversal cross section being the cross section along the transversal direction, the light scattering portion 2a is formed at the center of the planar portion 2f. In other words, the normal line NL passes through the center of the planar portion 2f.

In the light emitting surface portion, the shape in the cross section perpendicular to the longitudinal direction, that is, the shape in the transversal cross section being the cross section along the transversal direction, is a combination of the first light emitting surface portion 2b (first curved surface) being a convexly curved surface and the second light emitting surface portion 2c (second curved surface) being a convexly curved surface that is different in the curved shape from the first light emitting surface portion 2b. The first light emitting surface portion 2b and the second light emitting surface portion 2c are connected smoothly and continuously at an inflection point 2e (continuous point). While a word "inflection point" is employed since FIG. 6 is the transversal cross section being the cross section along the transversal direction of the light guide 2, the light guide 2 is extending along the longitudinal direction, and thus a plurality of inflection points are actually arranged in the longitudinal direction.

A second planar portion 2g, which is flat and provided in a side surface of the light guide 2 along the longitudinal direction, is disposed between the planar portion 2f of the light guide 2 shown in FIG. 6 and the first light emitting surface portion 2b. Further a third planar portion 2h, which is flat and provided in a side surface of the light guide 2 along the longitudinal direction, is disposed between the planar portion 2f and the second light emitting surface portion 2c. In the transversal cross section being the cross section along the transversal direction, the shapes of the second planar portion 2g, the third planar portion 2h, and the planar portion 2f are naturally straight. In the transversal cross section being the cross section along the transversal direction, the length of the straight line of the second planar portion 2g is shorter than that of the third planar portion 2h.

As shown in FIG. 6, in the transversal cross section being the cross section along the transversal direction, the inflection point 2e is arranged at a point where the dotted line L1 passing through the end portion of the light scattering portion 2a in the side of the second light emitting surface portion 2c intersects with the light emitting surface portion of the light guide 2. The dotted line L1 is perpendicular to the planar portion 2f. Naturally, in the transversal cross section being the cross section along the transversal direction, the intersection point of the dotted line L1 and the light emitting surface portion of the light guide 2 may be arranged in the second light emitting surface portion 2c by widening the width of light scattering portion 2a. However, a trade-off will be necessary since light collection capability by the first light emitting surface portion 2b and the second light emitting surface portion 2c is reduced. In other words, it can be said that not only by the shape of the first light emitting surface portion 2b and the second light emitting surface portion 2c, but also by widening or narrowing the width of the light scattering portion 2a, the light collection capability of the light guide can be adjusted. Note that, in the transversal cross section being the cross section along the transversal direction, the inflection point 2e is shifted (deviated) to the side of the second light emitting surface portion 2c from the intersection point of the normal line NL and the light emitting surface portion (the first light emitting surface portion 2b).

Figure 7A:
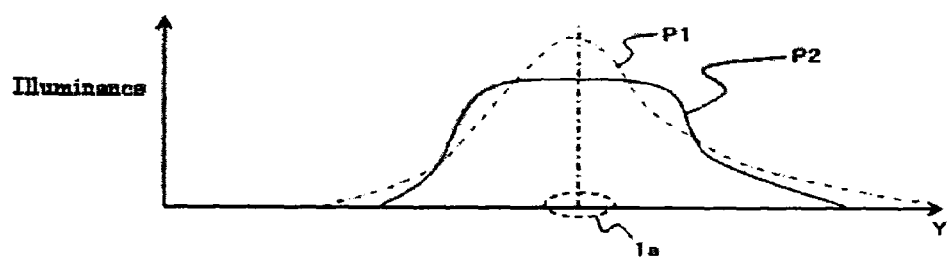
FIGS. 7A, 7B are diagrams showing illuminance distribution and light emitting paths in the light guide according to Embodiment 1 of the present disclosure.
Figure 7B:
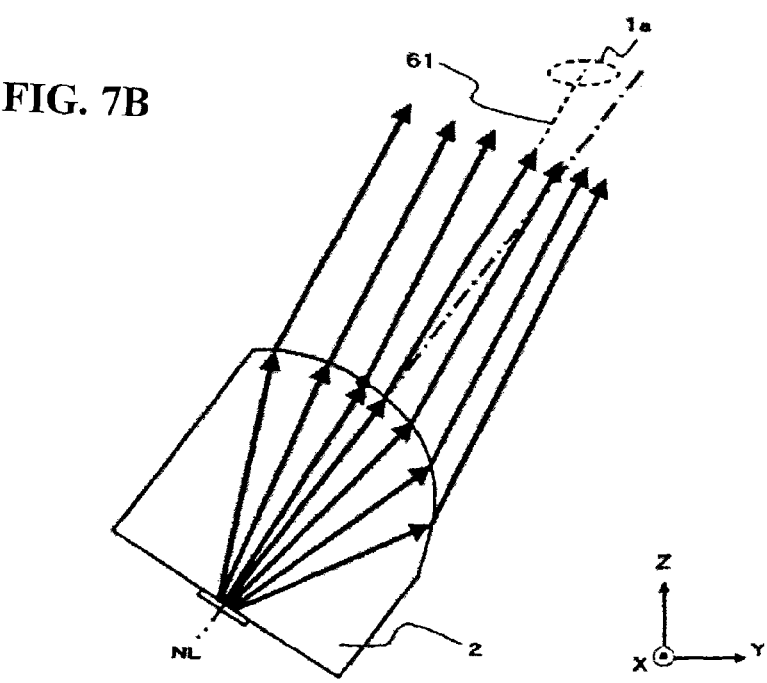

FIG. 7A is a diagram showing illuminance distribution in the transversal direction in the light guide 2. FIG. 7B is a diagram showing light emitting paths in the light guide 2. In the distribution diagram shown in FIG. 7A, the vertical axis shows illuminance. The horizontal axis shows illuminance distribution in the Y axis direction (sub-scanning direction). The position where the Y axis direction intersects with a dotted line is around the center of the irradiated portion 1a. The dashed-dotted line shown in FIG. 7A corresponds to the optical axis of the imaging optical system 8. In FIG. 7B, an optical path 61 is indicated by the dotted line. The light travelling in the optical path 61 is arranged to irradiate the center of the irradiated portion 1a.

The optical path 61 in FIG. 7B is described as follows. The light travelling in the optical path (optical path inside light guide 2) on the normal line NL that is to the light scattering portion 2a and that passes through the center of the light scattering portion 2a in the transversal cross section being the cross section along the transversal direction, is refracted by the first light emitting surface portion 2b when emitted from the light guide 2. An optical path through which the refracted light travels is the optical path 61. Further, similar to FIGS. 5A, 5B as a target for comparison, FIGS. 7A, 7B can be seen as a schematic diagram if the Y axis of FIG. 7A is seen as the feed path of the reading target 1 and if the center of the irradiated portion 1a is supposed to be on the extended line of the optical path 61 in FIG. 7B.

The normal line NL and the optical path 61 in FIG. 7B are inclined with respect to the reading target 1 not shown. That is, the normal line NL and the optical path 61 in FIG. 7B are inclined with respect to the Y axis. If the smaller angle (interior angle) within the angles at which the normal line NL intersects with the Y axis (reading target 1) is compared with the smaller angle (interior angle) within the angles at which the optical path 61 intersects with the Y axis (reading target 1), the angle at which the optical path 61 intersects with the Y axis (reading target 1) becomes larger than the angle at which the normal line NL intersects with the Y axis (reading target 1).

As shown in FIG. 7A, although the illuminance is the highest at the point where the line P2 showing illuminance distribution intersects with the dashed-dotted line, it is understood that the peak portion is centered around a position where the line P2 showing the illuminance distribution intersects with the dashed-dotted line and spreads across the Y axis direction (sub-scanning direction). As a target for comparison, the line P1 showing the distribution in FIG. 5A is added and shown by the dashed-two dotted line in FIG. 7A. Similar to the line P2 showing the illuminance distribution, the peak of the dashed-two dotted line P1 is located at the position where the dashed-two dotted line P1 intersects with the dashed-dotted line and the value is larger than that of the line P2 showing the illuminance distribution. However, it is understood that, when compared with the line P2 showing the illuminance distribution, the peak portion of the dashed-two dotted line P1 spreads less across the Y axis direction (sub-scanning direction) and is in an acute shape. In contrast, it is understood that the peak portion of the line P2 showing the illuminance distribution, compared with the dashed-two dotted line P1, spreads more across the Y axis direction (sub-scanning direction) and is in a flat shape.

The light from the light source element 3 guided inside the light guide 2 and reflected to the direction of normal line NL in the light scattering portion 2a is refracted by the first light emitting surface portion 2b, resulting in the light passing through the optical path 61 as shown in FIG. 7B. Rays of light reflected by the light scattering portion 2a at small angles with respect to the normal line NL are mostly bent in the first light emitting surface portion 2b, resulting in the rays of light nearly parallel to the optical path 61. As shown in FIG. 6, in the transversal cross section being the cross section along the transversal direction, the first light emitting surface portion 2b has a steeper gradient as coming close to the side surface, that is, as getting away from the second light emitting surface portion 2c (inflection point 2e) and coming close to the second planar portion 2g. Namely, the curvature of the first light emitting surface portion 2b becomes larger as getting away from the inflection point 2e.

Thus, the light that enters from the light scattering portion 2a is greatly bent at the first light emitting surface portion 2b, and the light emitted from the first light emitting surface portion 2b is the emitted light nearly parallel to the optical path 61 with the optical path 61 as reference. The rays of light are greatly bent at the first light emitting surface portion 2b and thereby luminous flux density of the emitted light becomes high, and thus the illuminance is enhanced. Naturally, the optical path 61 is also an optical path for the light emitted from the first light emitting surface portion 2b. Furthermore, in the light guide (light guide 2) according to Embodiment 1, the second light emitting surface portion 2c is connected smoothly with the first light emitting surface portion 2b at the inflection point 2e and emits rays of light in such a manner that the gradient at the vicinity of the inflection point 2e is the same as that of the first light emitting surface portion 2b.

Comparison is made such that the light emitting surface portion (first light emitting surface portion 2b, second light emitting surface portion 2c) of the light guide (light guide 2 shown in FIGS. 6 and 7A, 7B) according to Embodiment 1 and the light emitting surface portion (light emitting surface portion 2d) of the light guide 2 in the comparative example shown in FIGS. 4 and 5 each are divided into two portions by the normal line NL. In the light guide (light guide 2 shown in FIGS. 6 and 7A, 7B) according to Embodiment 1, in contrast to a part of the light emitting surface portion closer to the side of irradiated portion 1a (mostly light emitting surface portion composed of second light emitting surface portion 2c), luminous flux density of the emitted light in the other part of the light emitting surface portion in the opposite side (light emitting surface portion only composed of first light emitting surface portion 2b) becomes high and thus the illuminance is enhanced. Thereby, uniform illuminance distribution in the Y axis direction can be obtained, and the light is collected so as for the emitted light to be nearly parallel, so that the illuminance is high and the illuminance uniformity in the reading depth direction (depthwise direction) can be enhanced. In contrast, regarding the light guide 2 in the comparative example shown in FIGS. 4 and 5A, 5B, in two parts of the light emitting surface portion 2d divided by the normal line NL, since the one part of the light emitting surface portion 2d closer to the side of irradiated portion 1a and the other part of the light emitting surface portion 2d in the opposite side are symmetric with respect to an axis as the normal line NL, luminous flux density of the emitted light is not so different in the two parts of the light emitting surface portion 2d divided by the normal line NL.

Because of the reason described above, as shown in FIG. 7A, instead of the characteristic with such a steep curve as the line P1 (dashed-two dotted line) showing the illuminance distribution in the light guide 2 of the comparative example, the illuminance distribution shown by the flat line P2 (solid line) in the Y axis direction and centered around the irradiated portion 1a can be obtained in the light guide (light guide 2) according to Embodiment 1. This is due to the facts that the light emitted from the part of the light emitting surface portion in the opposite side to the other part of the light emitting surface portion near to the side of the irradiated portion 1a is greatly refracted by the first light emitting surface portion 2b compared with the second light emitting surface portion 2c, and the irradiated portion 2a is set to be on the extended line of the optical path 61 instead of the extended line of the normal line NL. Needless to say that this arrangement is not an essential condition, but the illuminance can be easily made uniform by the arrangement.

Further, in the light guide (light guide 2) according to Embodiment 1, in order to enhance the luminous flux density of the rays of light emitted from the second light emitting surface portion 2c, a curved shape similar to that of the first light emitting surface portion 2b may be formed. The similar curved shape is such that the gradient of the second light emitting surface portion 2c becomes steeper as coming close to the vicinity of side surface contacting the second light emitting surface portion 2c, that is, as getting away from the inflection point 2e in the transversal cross section being the cross section along the transversal direction and coming close to the third planar portion 2h. Namely, the curvature of the second light emitting surface portion 2c becomes larger as getting away from the inflection point 2e. However, it is a matter of course that, even in a case where the shape is adopted for the second light emitting surface portion 2c, it is necessary to configure the light emitting surface portion with the first light emitting surface portion 2b and the second light emitting surface portion 2c that are continuous and to keep a relation such that the first light emitting surface portion 2b has a longer circumferential length than that of the second light emitting surface portion 2c in the transversal cross section being the cross section along the transversal direction.

Figure 8A:
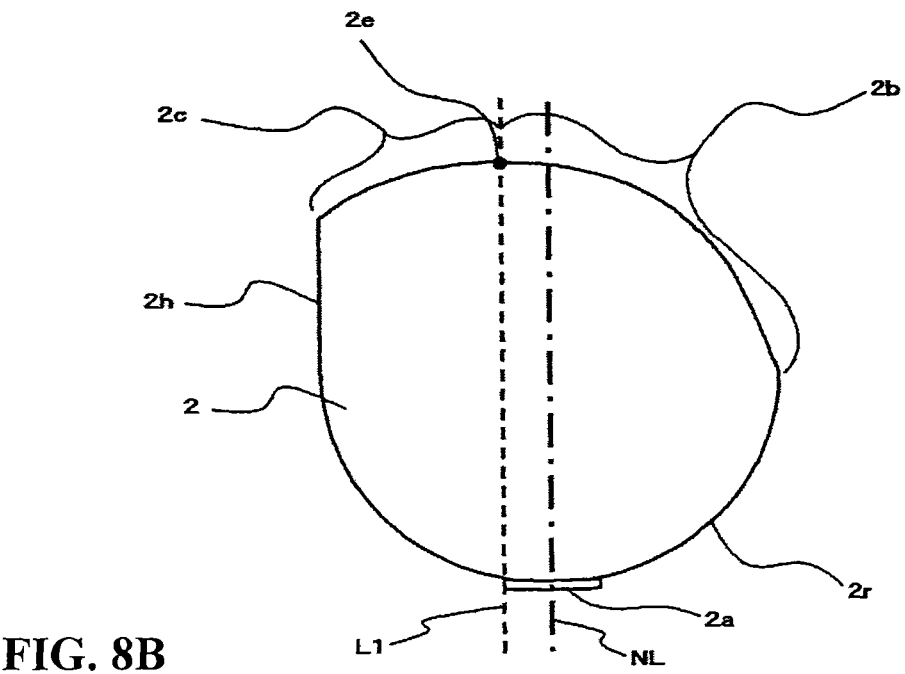
FIGS. 8A-8C are cross sectional views taken along the transversal direction in the light guide according to Embodiment 1 of the present disclosure.
Figure 8B:
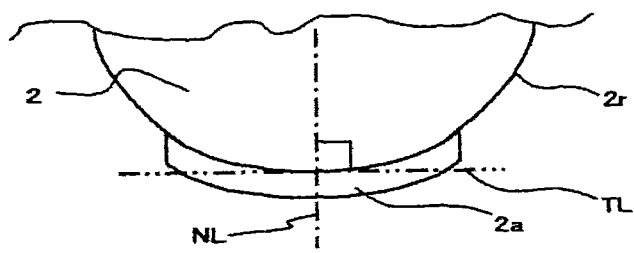
Figure 8C:
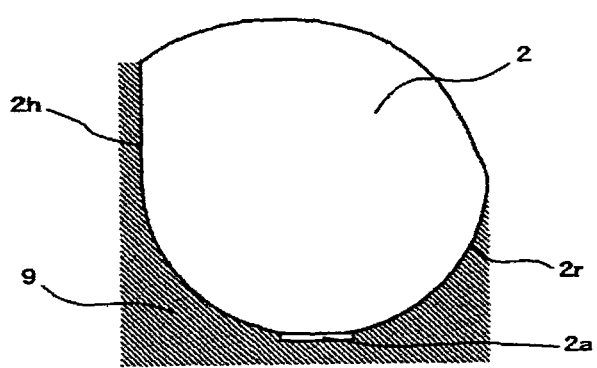

A light guide 2 shown in FIGS. 8A-8C is a variation of the light guide (light guide 2) according to Embodiment 1 and the light guide 2 installed in the image reading apparatus according to Embodiment 1. FIG. 8A is a transversal cross section being a cross section along the transversal direction in the light guide 2, FIG. 8B is a cross section of the light guide 2 where the periphery of the light scattering portion 2a in the cross section shown in FIG. 8A is enlarged, and FIG. 8C is a cross section of the image reading apparatus where the periphery of the light guide 2 is enlarged in a case of the light guide 2 shown in FIG. 8A installed in the housing 9 of the image reading apparatus. Note that, the housing 9 (image reading apparatus) shown in FIG. 8C is a case where the apparatus is not provided with the reflector 6. In the transversal cross section being the cross section in the transversal direction, the light guide 2 described using FIGS. 1, 2, 6, and 7 is composed of linear planar portions, i.e. the planar portion 2f, the second planar portion 2g, and the third planar portion 2h, except for the light emitting surface portions (first light emitting surface portion 2b, second light emitting surface portion 2c). However, the light guide (light guide 2) according to Embodiment 1 in the transversal cross section being the cross section in the transversal direction may have a curved shape similar to the light emitting surface portions, in the portions in addition to the light emitting surface portions.

In the light guide 2 shown in FIG. 8 FIGS. 8A, 8B, portions corresponding to the planar portion 2f and the second planar portion 2g are replaced with a curved surface portion 2r. Naturally, the third planar portion 2h may be in a curved shape. The curved surface portion 2r provided in a curved shape in the side surface of the light guide 2 along the longitudinal direction is formed continuously with the first light emitting surface portion 2b. The curved surface portion 2r is in a curved shape in the transversal cross section being the cross section in the transversal direction. The third planar portion 2h that is flat and provided in the side surface of the light guide along the longitudinal direction is disposed between the curved surface portion 2r and the second light emitting surface portion 2c.

The light scattering portion 2a is formed on the light guide 2 shown in FIGS. 8A, 8B. That is, the light scattering portion 2a that extends along the longitudinal direction is disposed on the side surface of the light guide 2 and the light emitting surface portions (first light emitting surface portion 2b and second light emitting surface portion 2c) is provided in the surface opposite to the light scattering portion 2a. For more detail, the light scattering portion 2a is formed on the curved surface portion 2r that is a curved side surface of the light guide 2 along the longitudinal direction and reflects the light guided inside the light guide 2. In FIGS. 8A and 8B, the normal line NL to a tangential line TL (dashed-two dotted line), which passes through the center of the curved light scattering portion 2a in the transversal cross section being the cross section along the transversal direction, is shown by the dashed dotted line.

In the light guide 2 shown in FIGS. 8A, 8B as is the case with the light guide 2 described using FIGS. 1, 2, 6, and 7A, 7B, as shown in FIG. 8A, in the transversal cross section being the cross section along the transversal direction, the inflection point 2e is arranged at the point where the dotted line L1 passing through the end portion of the light scattering portion 2a in the side of the second light emitting surface portion 2c intersects with the light emitting surface portion of the light guide 2. That is, in the transversal cross section being the cross section along the transversal direction, the inflection point 2e is shifted (deviated) to the side of the second light emitting surface portion 2c from the intersection point of the normal line NL and the light emitting surface portion (first light emitting surface portion 2b) of the light guide 2. Naturally, in the transversal cross section being the cross section along the transversal direction, the intersection point of the dotted line L1 and the light emitting surface portion of the light guide 2 may be arranged in the second light emitting surface portion 2c by widening the width of light scattering portion 2a.

Therefore, also in the light guide 2 shown in FIGS. 8A, 8B, in contrast to a part of the light emitting surface portion closer to the side of irradiated portion 1a (mostly light emitting surface portion composed of second light emitting surface portion 2c), luminous flux density of the emitted light in the other part of the light emitting surface portion in the opposite side (light emitting surface portion only composed of first light emitting surface portion 2b) becomes high and thus the illuminance is enhanced. Thereby, uniform illuminance distribution in the Y axis direction can be obtained, and the light is collected so as for the emitted light to be nearly parallel, so that the illuminance is high and the illuminance uniformity in the reading depth direction (depthwise direction) can be enhanced.

Next, a relation between illuminance and the curvature of the first light emitting surface portion 2b and the second light emitting surface portion 2c in the transversal cross section being the cross section along the transversal direction will be described. For more detail, FIGS. 7A, 7B is seen as a schematic diagram, and then illuminance will be described in a case where the smaller angle (interior angle) within the angles at which the normal line NL intersects with the reading target 1 is 45 degrees and the smaller angle (interior angle) within the angles at which the optical path 61 intersects with the reading target 1 is 49 degrees. Note that, the portion where the optical path 61 intersects with the reading target 1 corresponds to the center portion of the irradiated portion 1a. That is, the portion where the normal line NL intersects with the reading target 1 deviates from the center of the irradiated portion 1a.

Figure 9:
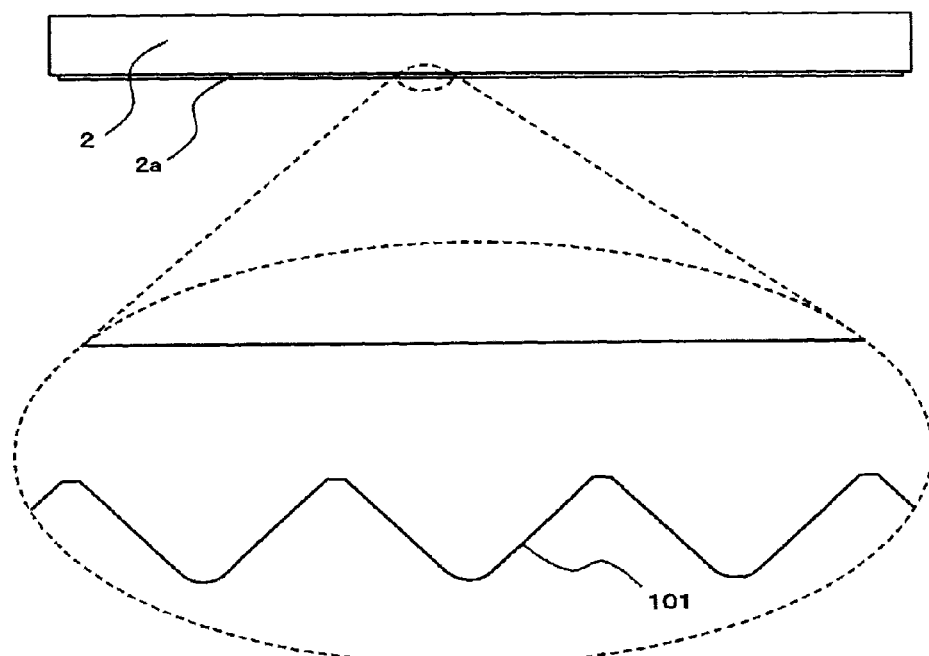
FIG. 9 is a cross sectional view taken along the longitudinal direction in the light guide according to Embodiment 1 of the present disclosure.

FIG. 9 is a cross section of the light scattering portion 2a of the light guide 2 in the longitudinal direction, described using FIGS. 1, 2, 6, and 7A, 7B. As a specific example, the material for the light guide 2 is an acryl, the height of the cross section in the transversal direction is 5 mm, the width thereof is 5 mm, and the width of the light scattering portion 2a is 1 mm. The light scattering portion 2a has a structure in which a plurality of light scattering prisms 101 each having about 100 μm in height and width are disposed as shown in FIG. 9. That is, a plurality of light scattering prisms 101 constitutes the light scattering portion 2a. An enlarged portion of the light scattering prisms 101 is shown in the portion encircled by the dotted line in FIG. 9. Note that, the height of the cross section in the transversal direction means the distance along the dotted line L1 between the light scattering portion 2a and the inflection point 2e in the transversal cross section being the cross section along the transversal direction. The width of the cross section in the transversal direction means the distance between the second planar portion 2g and the third planar portion 2h in the transversal cross section being the cross section along the transversal direction.

Figure 10:
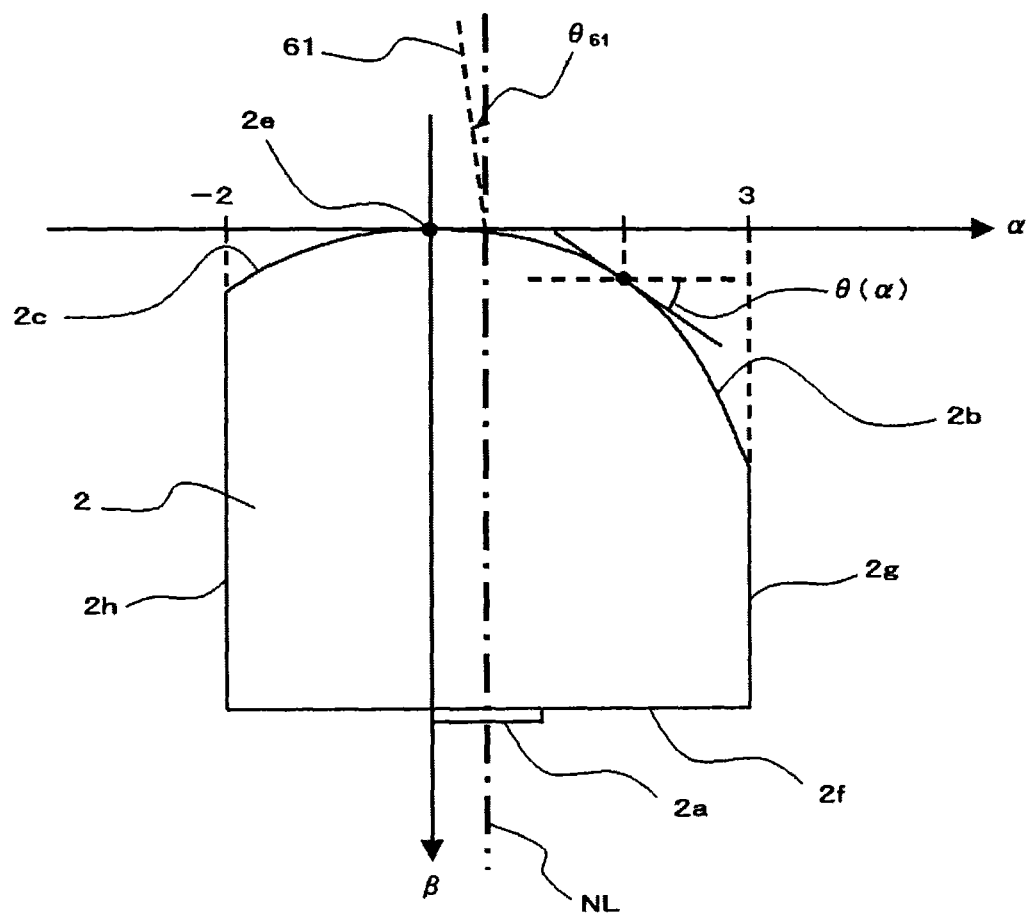
FIG. 10 is a cross sectional view taken along the transversal direction in the light guide according to Embodiment 1 of the present disclosure.

FIG. 10 is a cross sectional view taken along the transversal direction in the light guide (light guide 2) according to Embodiment 1, and in addition, coordinates are added in the cross sectional view for describing gradients in the first light emitting surface portion 2b and the second light emitting surface portion 2c. The coordinate system in FIG. 10 is the two-dimensional orthogonal coordinate system using an α axis and a β axis, and the inflection point 2e is defined as the origin, a perpendicular line to the light scattering portion 2a is defined as the β axis, and a line orthogonal to the β axis in the cross section in the transversal direction is defined as the α axis. As for the dimension of the light guide 2, the foregoing height of the cross section in the transversal direction is 5 mm, and the foregoing width thereof is 5 mm. Thus, in FIG. 10, the coordinates of the intersection point of the α axis and the dotted line that extends the second planar portion 2g is (3, 0) and the coordinates of the intersection point of the α axis and the dotted line that extends the third planar portion 2h is (−2, 0). Further, the intersection point of the planar portion 2f and the β axis is (0, 5).

In the first light emitting surface portion 2b of the light guide (light guide 2) according to Embodiment 1, the curvature of circumference in the transversal cross section being the cross section along the transversal direction becomes larger as getting away from the second light emitting surface portion 2c. Thus, for the shape of the circumference of the first light emitting surface portion 2b in the transversal cross section being the cross section along the transversal direction, it is preferable to use a curve obtained from the formula for an ellipse out of formulas for a quadratic curve. It will be described that, for the shape of the circumference of the first light emitting surface portion 2b in the transversal cross section being the cross section along the transversal direction, by using a curve obtained by applying a formula for an aspherical surface used for designing an aspherical lens, performance of the light guide (light guide 2) according to Embodiment 1 is further enhanced.

Here, as an example, the formula for an aspherical surface in which a fourth order term and a sixth order term are added to a formula for a quadratic curve will be described. The formula for an aspherical surface in which a fourth order term and a sixth order term are added to the formula for a quadratic curve is the following formula 1. In the formula 1, R represents a radius of curvature, and K represents a conic constant. $A_4$ and $A_6$ represent an aspherical coefficient for the fourth order term and an aspherical coefficient for the sixth order term, respectively. As for the coordinates, the α axis and the β axis shown in FIG. 10 are used, which means the two-dimensional orthogonal coordinate system where the origin is placed at the inflection point 2e.

$$\beta=\alpha^2/[R+\sqrt{\{R^2-(1+K)\cdot\alpha^2\}}]+A_4\cdot\alpha^4+A_6\cdot\alpha^6 \quad \text{(Formula 1)}$$

In the formula 1, the first light emitting surface portion 2b is assumed to be expressed by the shape (curve) when R=3.8 mm, K=0.4, A4=0.0014, A6=0.0008, and the second light emitting surface portion 2c is assumed to be expressed by the shape (curve) when R=3.6 mm, K=0.4, A4=0, A6=0.0001. A gradient in the first light emitting surface portion 2b and the second light emitting surface portion 2c is expressed by the absolute value of $\theta(\alpha)$ in FIG. 10, the gradients in the vicinity of the inflection point 2e (origin) are $|\theta(0.5)|=7.5°$ and $|\theta(-0.5)|=7.9°$ that are similar in value, and the gradients at the intersection point with the second planar portion 2g and the third planar portion 2h (side surface) are $|\theta(3)|=66°$ and $|\theta(-2)|=31°$, and thus the gradient of the first light emitting surface portion 2b is larger. In addition, the optical path 61 is inclined at 4° with respect to the normal line NL as described before. The inclination 4° is the angle represented by θ61 in FIG. 10 (θ61=4°).

In a case where the light guide (light guide 2) according to Embodiment 1 is designed with the conditions described above, the illuminance distribution of the light guide 2 has the uniformity of 92% in the mm range in the transversal direction, the full width at half maximum of 10.8 mm, and the uniformity of 93% in the 1 mm depthwise direction. Therefore, as shown in the formula 1, the gradient at a position further from the origin can be made larger by adding the higher-order terms to the formula for a quadratic curve, compared with the normal formula of an ellipse, that is, the formula for an ellipse among formulas for a quadratic curve, so that the light guide 2 having higher illuminance can be realized, compared with a case where the formula of an ellipse is used.

Until now, in the light guide according to Embodiment 1, examples are described in which, in the transversal cross section being the cross section along the transversal direction, the normal line NL intersects with the light guide 2 at the position that deviates from the inflection point 2e and the dotted line L1 passing through the end portion of light scattering portion 2a in the side of second light emitting surface portion 2c passes through the inflection point 2e (illustrated). In addition, in the light guide according to Embodiment 1, an example is also described in which the normal line NL intersects with the light guide 2 at the position that deviates from the inflection point 2e to the side of the second light emitting surface portion 2c (not illustrated). However, in the following, it will be described that the light guide (light guide 2) according to Embodiment 1 and the light guide 2 installed in the image reading apparatus according to Embodiment 1 are not limited to the above-described structure.

Here, a light guide 2 will be described using FIGS. 11 and 12 in which the normal line NL intersects with the light guide 2 at a position that deviates from the inflection point 2e and the dotted line L1 passing through the end portion of the light scattering portion 2a in the side of the second light emitting surface portion 2c intersects with the light guide 2 at a position that deviates from the inflection point 2e to the side of the first light emitting surface portion 2b. This is a variation of the light guide (light guide 2) according to Embodiment 1 and the light guide 2 installed in the image reading apparatus according to Embodiment 1. Further, a light guide 2 will be described using FIG. 13 in which the normal line NL intersects with the light guide 2 at a position that deviates from the inflection point 2e, and although the dotted line L1 passing through the end portion of the light scattering portion 2a in the side of the second light emitting surface portion 2c passes through the inflection point 2e, the center of the light scattering portion 2a deviates to the side of the second planar portion 2g. This is also a variation of the light guide (light guide 2) according to Embodiment 1 and the light guide 2 installed in the image reading apparatus according to Embodiment 1.

Figure 11:
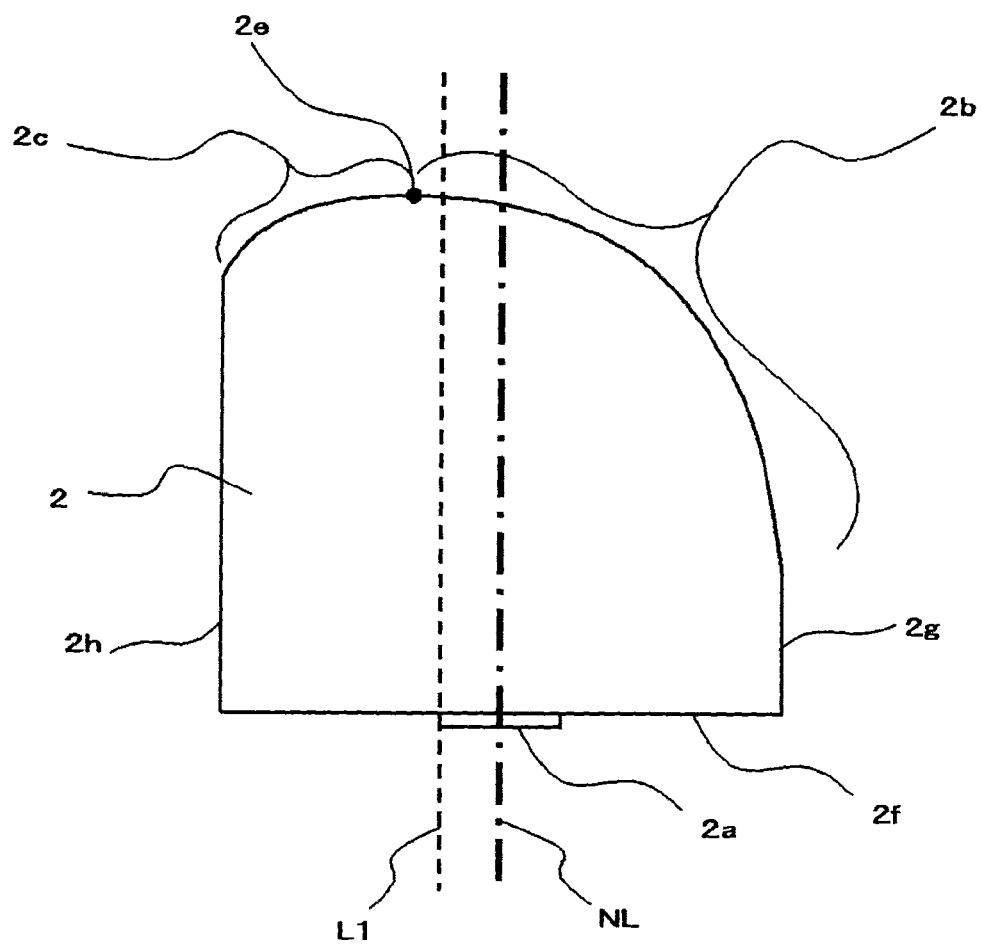
FIG. 11 is a cross sectional view taken along the transversal direction in the light guide according to Embodiment 1 of the present disclosure.
Figure 12:
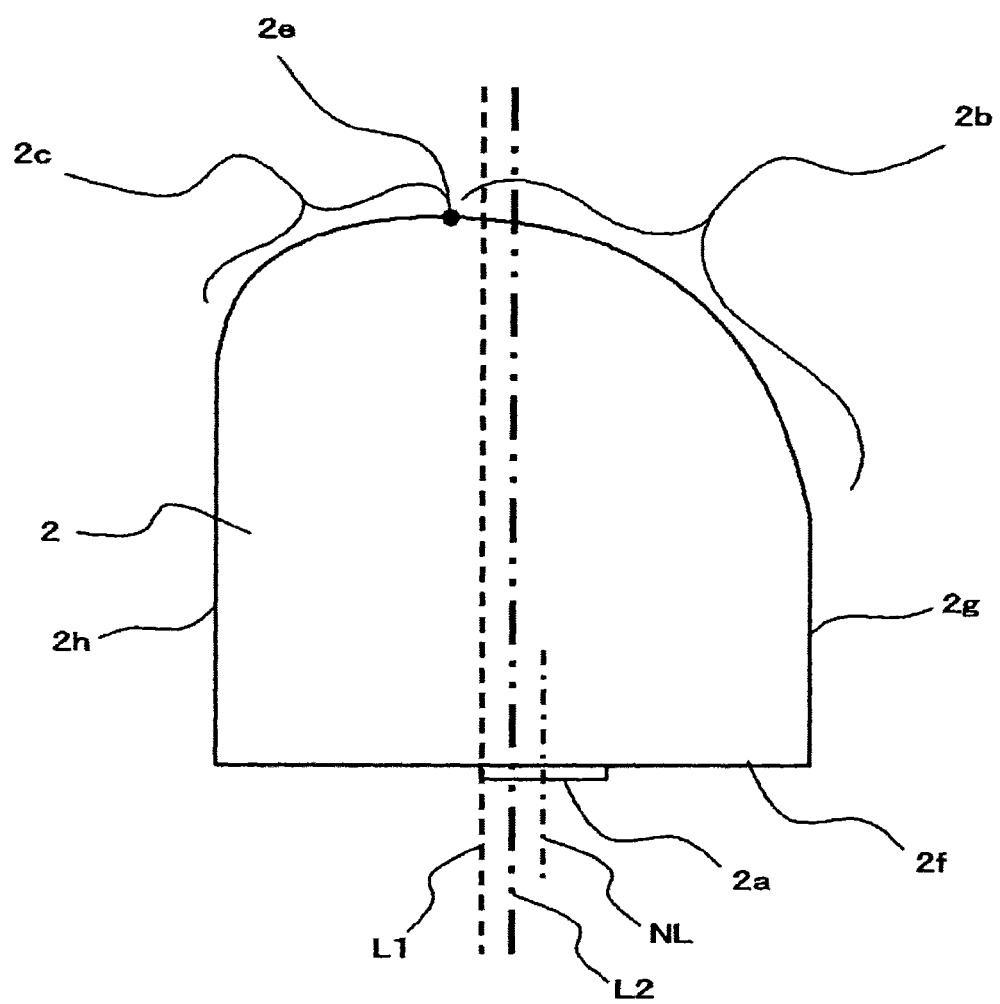
FIG. 12 is a cross sectional view taken along the transversal direction in the light guide according to Embodiment 1 of the present disclosure.

FIGS. 11 and 12 show transversal cross sections being the cross sections along the transversal direction and each show a variation of the light guide (light guide 2) according to Embodiment 1. In FIGS. 6 and 7, for example, the case is described in which the inflection point 2e is on the dotted line L1 passing through the end portion of the light scattering portion 2a. However, as shown in FIGS. 11 and 12, in the light guide (light guide 2) according to Embodiment 1, the inflection point 2e may be disposed such that it is shifted to the side of the third planar portion 2h (side surface) compared with that in the light guide 2 shown in FIG. 6, so that the dotted line L1 passing through the end portion of the light scattering portion 2a does not pass through the inflection point 2e. The light guide 2 shown in FIG. 11 represents a case where the center of the light scattering portion 2a corresponds to the center of the planar portion 2f. The light guide 2 shown in FIG. 12 represents a case where the center of the light scattering portion 2a deviates from the center of the planar portion 2f, and the center of the light scattering portion 2a deviates to the side of the second planar portion 2g (first light emitting surface portion 2b). In FIG. 12, the dashed-two dotted line L2 is a normal line passing through the planar portion 2f. That is, the dashed-two dotted line L2 is the normal line L2 (corresponds to normal line NL shown in FIGS. 6 and 7).

Figure 13:
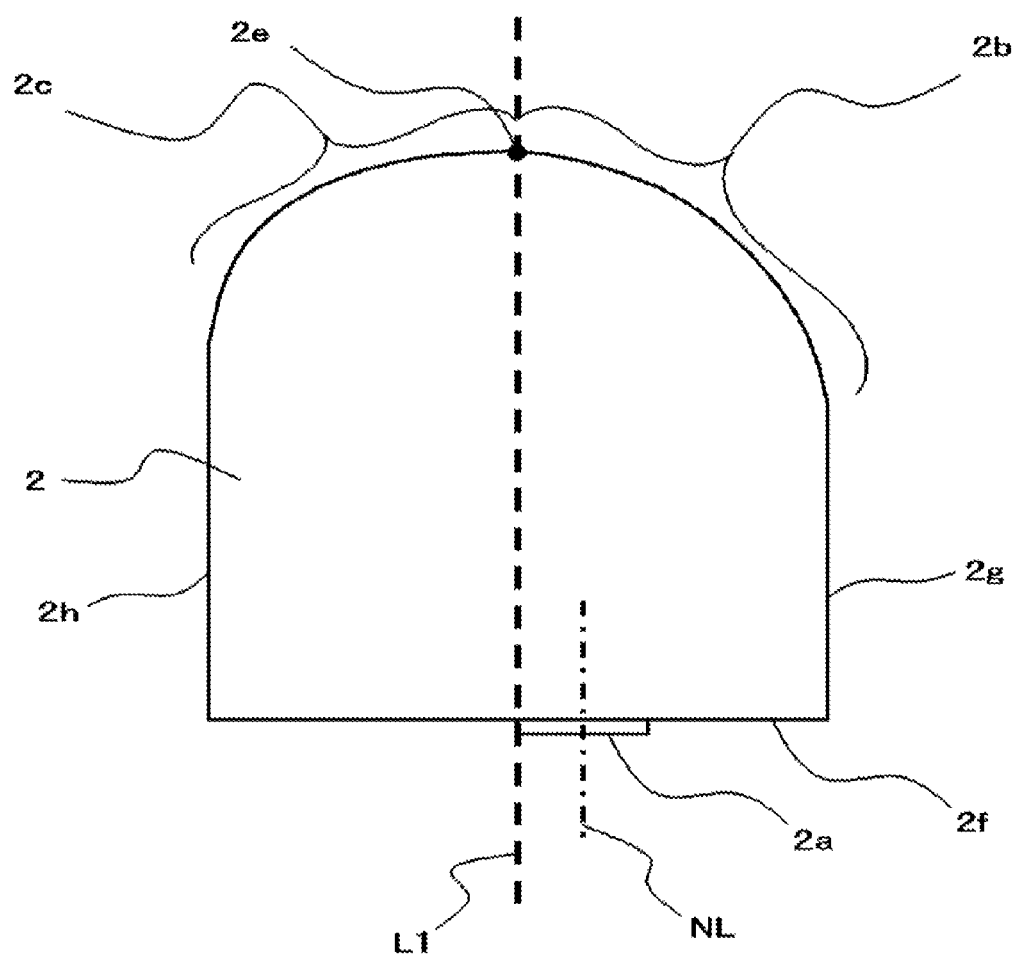
FIG. 13 is a cross sectional view taken along the transversal direction in the light guide according to Embodiment 1 of the present disclosure.

Next, a variation of the light guide (light guide 2) according to Embodiment 1 will be described using FIG. 13 in which the dotted line L1 of the light guide 2 shown in FIG. 12 passes through the inflection point 2e. FIG. 13 is a transversal cross section being a cross section along the transversal direction. In FIGS. 6 and 7, for example, the inflection point 2e that is on the dotted line L1 passing through the end portion of the light scattering portion 2a is in common, and the center of the light scattering portion 2a corresponding to the center of the planar portion 2f is in common in FIGS. 6, 7, and 11. In the light guide 2 shown in FIG. 13, the inflection point 2e is on the dotted line L1 passing through the end portion of the light scattering portion 2a and the center of the light scattering portion 2a deviates from the center of the planar portion 2f, and thus the structure is such that the light guide 2 shown in FIGS. 6 and 7 is combined with the light guide 2 shown in FIG. 12.

In the light guide 2, in the transversal cross section being the cross section along the transversal direction, a position where the normal line NL to the light scattering portion 2a intersects with the light guide 2 is placed in the first light emitting surface portion 2b, so that the inflection point 2e of the light guide 2 can be placed to the side of the third planar portion 2h (side surface). Thus, there is an advantage that the emitted light is greatly bent with ease. This also applies to the light guide 2 shown in FIG. 8. Further, the light scattering portion 2a shifted from the center of the planar portion 2f to the side of the first light emitting surface portion (second planar portion 2g (side surface)) results in an increase in the rays of light emitted from the shifted side. Thus, by the shift of the light scattering portion 2a to the first light emitting surface portion 2b (second planar portion 2g) that is the side where the emitted light is diffused and the illuminance tends to be decreased, the reduction in the illuminance can be compensated. This feature can also be applied to the light guide 2 shown in FIG. 8.

Figure 14:
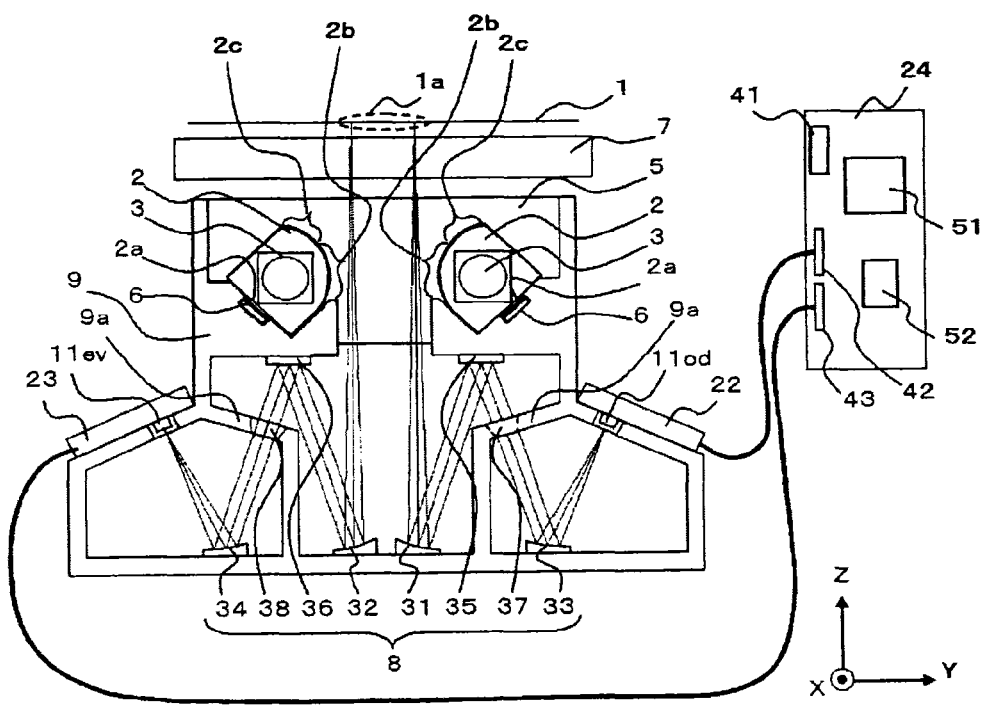
FIG. 14 is a perspective viewed from the longitudinal direction of the light guide and the image reading apparatus according to Embodiment 1 of the present disclosure.

As the imaging optical system 8 of the image reading apparatus according to Embodiment 1 so far, the erecting equal-magnification optical system 8 using rod lens array 8 or microlens array 8, etc. is exemplarily described using FIGS. 1 and 2. Here, using FIG. 14, it will be described that the imaging optical system 8 that can be applied to the image reading apparatus according to Embodiment 1 is not limited to the erecting equal-magnification optical system 8. FIG. 14 is a perspective viewed from the longitudinal direction of the image reading apparatus that has two reading positions separated in the transversal direction, according to Embodiment 1.

The image reading apparatus shown in FIG. 14 has two lines of the reading positions extending along the main scanning direction. Note that, the reading positions in the two lines in the image reading apparatus shown in FIG. 14 are in a staggered arrangement with each other. Thus, as for the sensor IC 11, two line of the sensor IC 11od and the sensor IC 11ev are disposed (arranged). Further, photodetectors of the sensor IC 11od and the sensor IC 11ev with each other are in a staggered arrangement and a plurality thereof are disposed in an array format. The sensor IC 11od is formed on a sensor board 22 and the sensor IC 11ev is formed on a sensor board 23. Since FIG. 14 is a perspective of the image reading apparatus viewed from the longitudinal direction, both of the sensor IC 11od and the sensor IC 11ev in a staggered arrangement can be seen in the figure. The details of the sensor IC 11od and the sensor IC 11ev will be later described using FIG. 15.

In the image reading apparatus shown in FIG. 14, the imaging optical system 8 being the erecting equal-magnification optical system 8 in the image reading apparatus shown in FIGS. 1 and 2 is replaced with another imaging optical system, and two lines of the reading areas separated in the transversal direction are provided. In the imaging optical system 8 shown in FIG. 14, optical paths are formed by a curved surface mirror 31, a curved surface mirror 32, a curved surface mirror 33, a curved surface mirror 34, a planar mirror 35, a planar mirror 36, an aperture 37, and an aperture 38. Further, since the two lines of the reading areas separated in the transversal direction are provided in the image reading apparatus shown in FIG. 14, the image reading apparatus is regarded as an apparatus in which the irradiated portion 1a is broad in the transversal direction (sub-scanning direction). In FIG. 14, the light guide 2 is also disposed so as for the second light emitting surface portion 2c to face the side of the reading target 1. In addition, since the optical path is folded by the reflection using the curved surface mirror and the planar mirror, the optical axis of the imaging optical system 8 is extending along the reading depthwise direction in between the reading target 1 and a first optical component.

Since FIG. 14 is the perspective of the image reading apparatus, viewed from the longitudinal direction, the two optical paths and the optical components that collect (converge) the light travelling each of the optical paths, although these paths and components are in a staggered arrangement with each other, can be seen in the diagram. The two optical paths are the optical path in which the reflected light traveling via the curved surface mirror 31, the planar mirror 35, the aperture 37, and the curved surface mirror 33 is received by the sensor IC 11od, and the optical path in which the reflected light traveling via the curved surface mirror 32, the planar mirror 36, the aperture 38, and the curved surface mirror 34 is received by the sensor IC 11ev.

The image reading apparatus shown in FIG. 14 will be described in detail. The light (illumination light) emitted from the light guide 2 irradiates the reading target 1 to be fed, and the reflection light that is reflected on the reading target 1 is to be received by the sensor IC 11 (sensor IC 11od, sensor IC 11ev). Explanation will be given for each reading position in the two lines of the sensor IC 11od and the sensor IC 11ev. Note that, the sensor IC 11od is formed on the sensor board 22 disposed at a position facing the curved surface mirror 33. The sensor IC 11ev is formed on the sensor board 23 disposed at a position facing the curved surface mirror 34. The sensor board 22 and the sensor board 23 are held by the housing 9 in portions facing the bottom (base plate) of the housing 9.

First, the optical path of the reflected light received by the sensor IC 11od proceeds to the sub-scanning direction (Y axis direction) with repeated reflection. As shown in FIG. 14, the reflected light from the reading target 1 proceeds to the sub-scanning direction (Y axis direction) by reflection via the curved surface mirror 31, the planar mirror 35, the aperture 37, and the curved surface mirror 33, and received by the sensor IC 11od. The curved surface mirror 31 is disposed at the position facing the reading target 1 on the bottom (base plate) of the housing 9 and in an array format along the main scanning direction (X axis direction). The planar mirror 35 is disposed on the rear surface (lower portion) of the portion holding the light guide 2 in the housing 9 and in an array format along the main scanning direction (X axis direction). The curved surface mirror 33 is disposed at the position facing the sensor board 22 (sensor IC 11od) on the bottom (base plate) of the housing and in an array format along the main scanning direction (X axis direction). In the housing 9, a light shielding portion 9a that shields the reflected light from the curved surface mirror 31 so as not to directly enter the curved surface mirror 33 is formed along the main scanning direction (X axis direction). The aperture 37, which is an opening made in the light shielding portion 9a between the planar mirror 35 and the curved surface mirror 33, is disposed in an array format along the main scanning direction (X axis direction). The light shielding portion 9a is extending along the Z axis direction toward the planar mirror 35 from a portion between the curved surface mirror 31 and the curved surface mirror 33, and is bent toward the optical path side between the planar mirror 35 and the curved surface mirror 33. The aperture 37 is formed at the bent portion.

Similarly, the optical path of the reflected light received by the sensor IC 11ev proceeds to the sub-scanning direction (Y axis direction) with repeated reflection. Note that, as shown in FIG. 14, the optical path of the reflected light received by the sensor IC 11ev proceeds to the same Y axis direction as the optical path of the reflected light received by the sensor IC 11od, but proceeds to the opposite direction. As shown in FIG. 14, the reflected light from the reading target 1 proceeds to the sub-scanning direction (Y axis direction) by reflection via the curved surface mirror 32, the planar mirror 36, the aperture 38, and the curved surface mirror 34, and received by the sensor IC 11ev. The curved surface mirror 32 is disposed at the position facing the reading target 1 on the bottom (base plate) of the housing 9 and in an array format along the main scanning direction (X axis direction). The planar mirror 36 is disposed on the rear surface (lower portion) of the portion holding the light guide 2 in the housing 9 and in an array format along the main scanning direction (X axis direction). The curved surface mirror 34 is disposed at the position facing the sensor board (sensor IC 11ev) on the bottom (base plate) of the housing 9 and in an array format along the main scanning direction (X axis direction). In the housing 9, a light shielding portion 9a that shields the reflected light from the curved surface mirror 32 so as not to directly enter the curved surface mirror 34 is formed along the main scanning direction (X axis direction). The aperture 38, which is an opening made in the light shielding portion 9a between the planar mirror 36 and the curved surface mirror 34, is disposed in an array format along the main scanning direction (X axis direction). The light shielding portion 9a is extending along the Z axis direction toward the planar mirror 36 from a portion between the curved surface mirror 32 and the curved surface mirror 34, and is bent toward the optical path side between the planar mirror 36 and the curved surface mirror 34. The aperture 38 is formed at the bent portion.

The optical path of the reflected light received by the sensor IC 11od and the optical path of the reflected light received by the sensor IC 11ev are arranged alternately (staggered arrangement) with a gap therebewteen in the X axis direction, and if the gap is nulled the optical paths are made symmetric. Thus, the light guide 2, the housing 9, and the imaging optical system 8 are also made symmetric in the structure if the gap is nulled. Next, the sensor IC 11od and the sensor IC 11ev corresponding to the optical paths, which are disposed alternately (staggered arrangement) with a gap in the X axis direction, will be described using FIG. 15.

Figure 15:
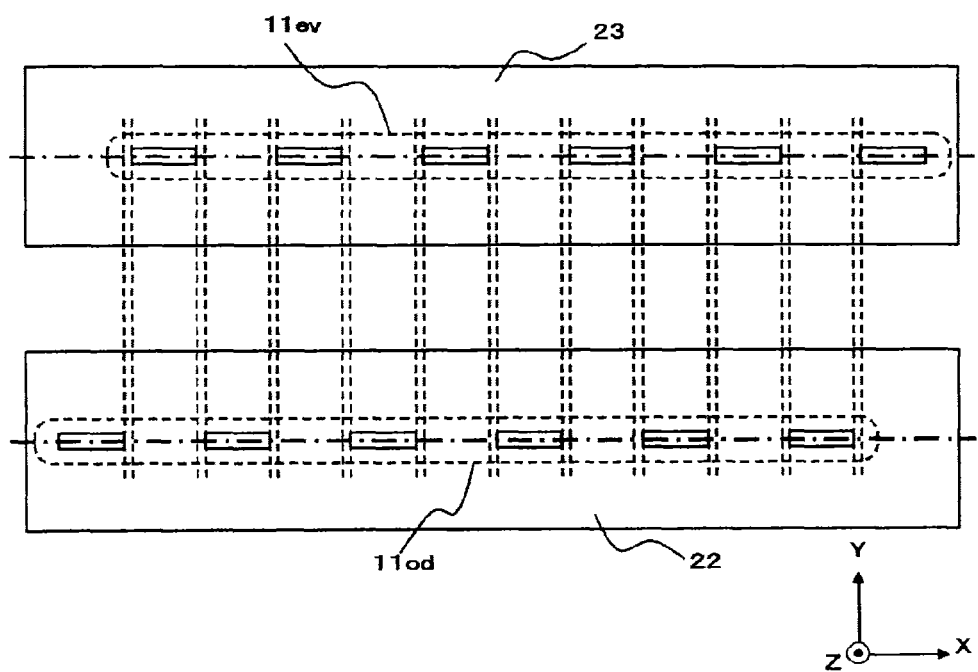
FIG. 15 is a diagram showing an arrangement of the sensor IC in the image reading apparatus according to Embodiment 1 of the present disclosure.

FIG. 15 is a diagram showing an arrangement of the sensor IC 11od (odd-numbered sensor IC 11od) and the sensor IC 11ev (even-numbered sensor IC 11ev) in the image reading apparatus provided with the light guide according to Embodiment 1. The sensor IC 11od (odd-numbered sensor IC 11od) and the sensor IC 11ev (even-numbered sensor IC 11ev) are equivalent to the sensor IC11 shown in FIG. 3. As shown in FIG. 15, the odd-numbered sensor IC 11od and the even-numbered sensor IC 11ev are alternately disposed in a staggered arrangement on the sensor board 22 and the sensor board 23, respectively. The staggered arrangement corresponds to the optical path via the curved surface mirror 31, the planar mirror 35, the aperture 37, and the curved surface mirror 33, and the optical path via the curved surface mirror 32, the planar mirror 36, the aperture 38, and the curved surface mirror 34.

In FIG. 15, the dashed dotted line indicates that the arrangement of the photodetectors is in the X axis direction (longitudinal direction). Further, the dotted lines parallel to the Y axis direction indicate that there is a clearance between the odd-numbered sensor IC 11od and the adjacent even-numbered sensor IC 11ev that are in a staggered arrangement. The clearances are provided in order to avoid stray light between the optical paths and between the photodetectors. That is, the sensor IC 11od and the sensor IC 11ev are not disposed overlappingly in the X axis direction. Note that, even in the case where the imaging optical system 8 is the erecting equal-magnification optical system 8, the sensor IC 11 in the image reading apparatus according to Embodiment 1 may be in a staggered arrangement in the main scanning direction (X axis direction) in the same way as the sensor IC 11od (odd-numbered sensor IC 11od) and the sensor IC 11ev (even-numbered sensor IC 11od). Naturally in the case described above, each erecting equal-magnification optical system 8 is needed to be in the staggered arrangement in accordance with the sensor IC 11. It is noted that in the case where the erecting equal-magnification optical system 8 and the sensor IC 11 are in a staggered arrangement, part of the neighboring portions thereof are generally arranged overlappingly in the X axis direction (main scanning direction). This is necessary to connect the images between the neighboring sensor ICs that are in staggered arrangement.

In the image reading apparatus described using FIGS. 14 and 15, the light reflected by the reading target 1 is collected in the sensor IC 11od or the sensor IC 11ev in the two optical paths. The light in one optical path is collected in the sensor IC 11od via the curved surface mirror 31, the curved surface mirror 33, the planar mirror 35, and the aperture 37. The light in the other optical path is collected in the sensor IC 11ev via the curved surface mirror 32, the curved surface mirror 34, the planar mirror 36, and the aperture 38. The sensor IC 11od and the sensor IC 11ev each receive the collected light, and the sensor IC 11od and the sensor IC 11ev each produce an output. The outputted electrical signals are transmitted from a connector 42 and a connector 43 to a signal processing board 24 and stored in a memory 52. Image coupling and signal processing are applied to the image information stored in the memory 52 by the signal processing IC 51. Note that, the external connector 41 is used for an interface of input/output signals including a signal processing output of the signal processing IC51.

In the light guide (light guide 2) according to Embodiment 1, illuminance that is broad in the transversal direction (Y axis direction) can be easily obtained. Thus, the light guide is applicable to the image reading apparatus shown in FIG. 14 that has two reading positions located apart in the transversal direction (Y axis direction) and also applicable to the above-mentioned case where the erecting equal-magnification optical system 8 and the sensor IC 11 are in a staggered arrangement. For example, in a case where the optical path from the imaging optical system 8 (curved surface mirror 31, curved surface mirror 32) to the reading target 1 is vertical and the reading positions are located in two positions (two lines) that are 3.2 mm apart in the transversal direction, it is preferable that irradiated light having uniform illuminance with about 4 mm width in the transversal direction can be obtained for making the illuminance in the two (two-lined) reading positions uniform. The light guide (light guide 2) according to Embodiment 1 can be easily applied to the image reading apparatus having the two reading positions.

In the two light guides 2 shown in FIGS. 1 and 2, although the optical paths 61 of the light guide 2 are not shown, each of the optical paths 61 is supposed to intersects with the center of the irradiated portion 1a and the center of the irradiated portion 1a corresponds to the center of the reading position. Meanwhile, in the two light guides 2 shown in FIG. 14, although the optical paths 61 of the light guide 2 are not shown, each of the optical paths 61 is supposed to intersects with the center of the irradiated portion 1a and the center of the irradiated portion 1a is located between the two-lined reading positions. Naturally, each of the optical paths 61 of the two light guides 2 shown in FIG. 14 may intersect with the nearby reading position. In this case, extended lines of the optical paths 61 of the two light guides 2 intersect in the opposite side of the reading target 1 to the light guides 2, that is, in the opposite side of the reading surface of the reading target 1.

Therefore, the image reading apparatus according to Embodiment 1 includes at least two light guides 2 and the plurality of the light guides 2 are disposed so that the normal lines NL intersect with each other in the transversal cross section being the cross section along the transversal direction. In addition, the image reading apparatus according to Embodiment 1, where a point at which the normal lines NL intersect with each other is arranged between the reading target 1 and the light guides 2, includes the imaging optical system 8 for converging reflected light that is the light emitted from the light guides 2 and reflected by the reading target 1. Note that, in the above-mentioned case where the extended lines of the optical paths 61 of the two light guides 2 intersect in the opposite side of the reading surface of the reading target 1, that is, the center of the irradiated portion 1a is disposed at each of the reading positions, the position of the point where the normal lines NL intersect with each other is not limited to a position between the reading target 1 and the imaging optical system 8. Thus, the image reading apparatus according to Embodiment 1 includes the imaging optical system 8 for converging reflected light that is the light emitted from the light guides 2 and reflected by the reading target 1. Naturally, the image reading apparatus according to Embodiment 1 may include only one light guide 2.

Embodiment 2

Figure 16:
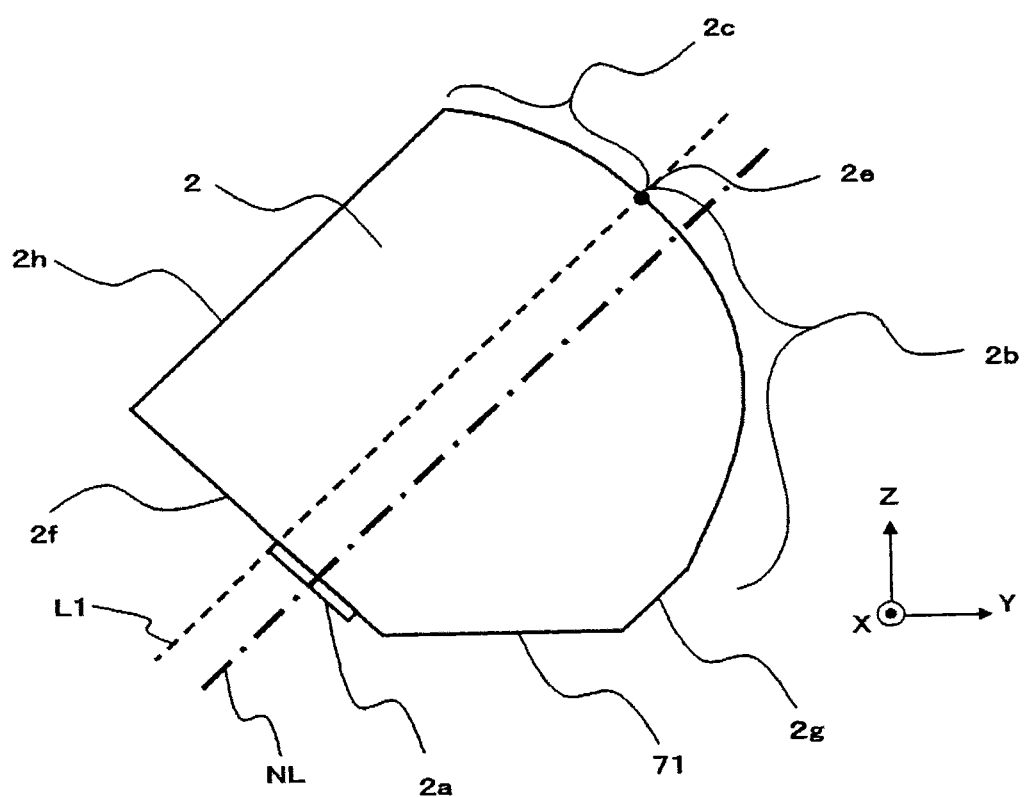
FIG. 16 is a cross sectional view taken along the transversal direction in a light guide according to Embodiment 2 of the present disclosure.
Figure 17:
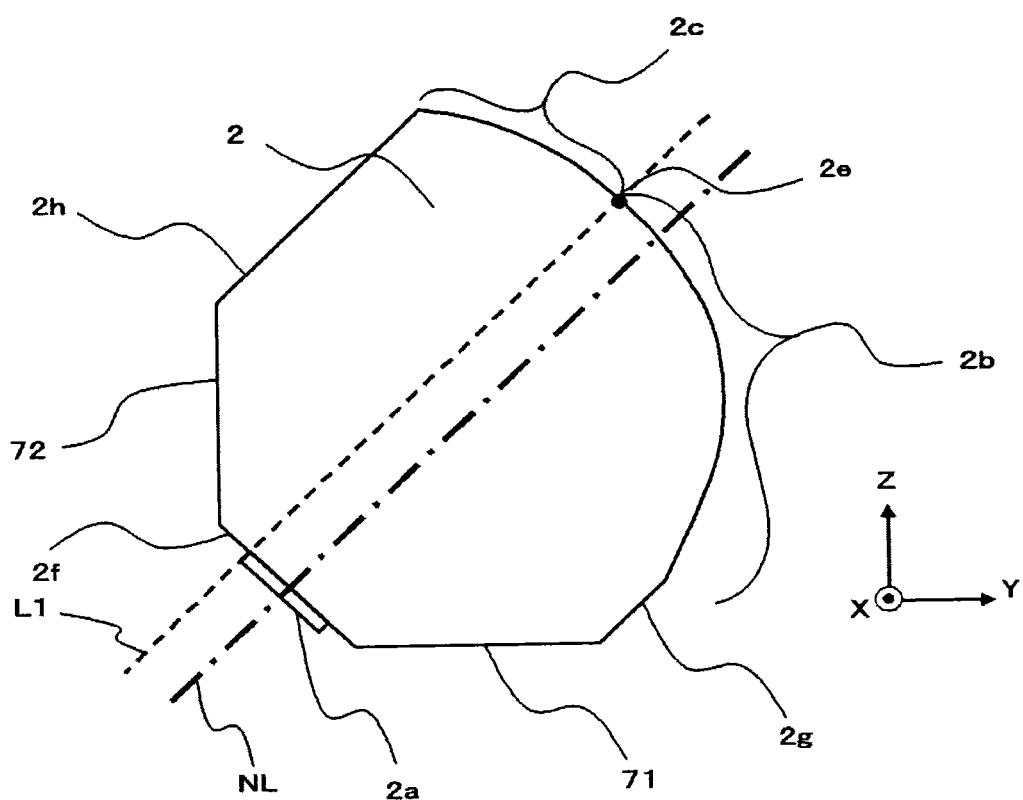
FIG. 17 is a cross sectional view taken along the transversal direction in a light guide according to Embodiment 2 of the present disclosure.

A light guide and an image reading apparatus according to Embodiment 2 of the present disclosure will be described using FIGS. 16 and 17. In the figures, the same or corresponding constituent elements are denoted by the same reference numerals, and the descriptions thereof are omitted. Further, since the difference between the light guide and the image reading apparatus according to Embodiment 2 and the light guide and the image reading apparatus according to Embodiment 1 is only in the shape of the light guide 2, any other descriptions will be omitted. FIGS. 16 and 17 show transversal cross sections of the light guides, being the cross sections along the transversal direction, according to Embodiment 2.

As shown in FIG. 16, the light guide according to Embodiment 2 is such that the light guide 2 shown in FIG. 6 used for describing the light guide according to Embodiment 1, which is installed with its normal line NL (dotted line L1) being inclined, includes a fourth planar portion 71 (horizontal planar portion 71) extending along the longitudinal portion (X axis direction) at the lower side. Here, description will be given assuming that the Y axis direction is the horizontal direction and the line segment of the fourth planar portion 71 in the cross section along the transversal direction is horizontal.

The light guide (light guide 2) according to Embodiment 2 provided with the fourth planar portion 71 can be installed in such a way that the fourth planar portion 71 is pressed against or abutted against an installation plane of the housing 9 in which the light guide 2 is installed. Thus, positional variations in the depthwise direction of the light guide 2 can be reduced. In addition, an installation dimension in the Z axis direction can be reduced. Specifically, in a case where the light guide 2 is obliquely installed at θ° to the Y axis, the fourth planar portion 71 is formed by chamfering the right-angled corner portion, so that the installation dimension in the horizontal depth direction, that is, in the Z axis direction is reduced by the depth of the fourth planar portion 71× cos θ× sin θ, compared to that before the chamfering. Consequently, for example, in the image reading apparatus including the imaging optical system 8 shown in FIG. 14, by reducing the installation dimension of the light guide 2 in the Z direction, a degree of freedom in installation positions for the planar mirror 35 and the planar mirror 36 and options for the shape of the housing 9 are increased.

In FIG. 17, a fifth planar portion 72 (vertical planar portion 72) extending along the longitudinal direction (X axis direction) is further formed on the light guide 2 shown in FIG. 16. Description will be given assuming that the Z axis direction is the vertical direction as well as the Y axis direction is the horizontal direction, and the line segment of the fifth planar portion 72 in the cross section along the transversal direction is vertical. Being provided with the fourth planar portion 71 and the fifth planar portion 72, the light guide (light guide 2) according to Embodiment 2 can reduce positional variations of the light guide 2 in the depthwise direction, that is, in the Z axis direction. Further, the light guide can be installed in such a way that the fifth planar portion 72 is pressed against or abutted against a sidewall plane parallel to the transversal direction in an installation place of the housing 9 in which the light guide 2 is installed. Thus, positional variations of the light guide 2 in the transversal direction can be reduced and additionally, an installation dimension in the transversal direction can be made small.

The second planar portion 2g, which is flat and formed along the longitudinal direction in the side surface of the light guide 2, and the fourth planar portion 71 are disposed between the planar portion 2f shown in FIG. 16 and the first light emitting surface portion 2b. Further, the second planar portion 2g, which is flat and formed along the longitudinal direction in the side surface of the light guide 2, and the fourth planar portion 71 are disposed between the planar portion 2f shown in FIG. 17 and the first light emitting surface portion 2b, and furthermore, the third planar portion 2h, which is flat and formed along the longitudinal direction in the side surface of the light guide 2, and the fifth planar portion are disposed between the planar portion 2f and the second light emitting surface portion 2c. Naturally, without forming the fourth planar portion 71, the light guide (light guide 2) according to Embodiment 2 and the light guide 2 installed in the image reading apparatus according to Embodiment 2 may only include the fifth planar portion 72. In the case described above, positional variations of the light guide 2 in the transversal direction can be reduced.

Embodiment 3

A light guide and an image reading apparatus according to Embodiment 3 of the present disclosure will be described using FIGS. 18 to 22. In the figures, the same or corresponding constituent elements are denoted by the same reference numerals, and the descriptions thereof are omitted. Further, since the difference between the light guide and the image reading apparatus according to Embodiment 3 and the light guide and the image reading apparatus according to Embodiments 1 and 2 is only in the shape of the light guide 2, any other descriptions will be omitted. FIGS. 18 to 22 show transversal cross sections of the light guides, being the cross sections along the transversal direction, according to Embodiment 3. In the light guide 2 shown in FIG. 6 and described as an example of the light guide according to Embodiment 1, side surfaces except for the first light emitting surface portion 2b and the second light emitting surface portion 2c are configured with three planes that are orthogonal in the transversal cross section being the cross section along the transversal direction of the light guide 2. Thus, there is a case where, if the reflected light strikes the above-mentioned planes at an incident angle less than a total reflection angle, the reflected light from the light scattering portion 2a passes through the above-mentioned planes and does not contribute to the illumination. Embodiment 3 aims at a reduction of light that does not contribute to the illumination.

Figure 18:
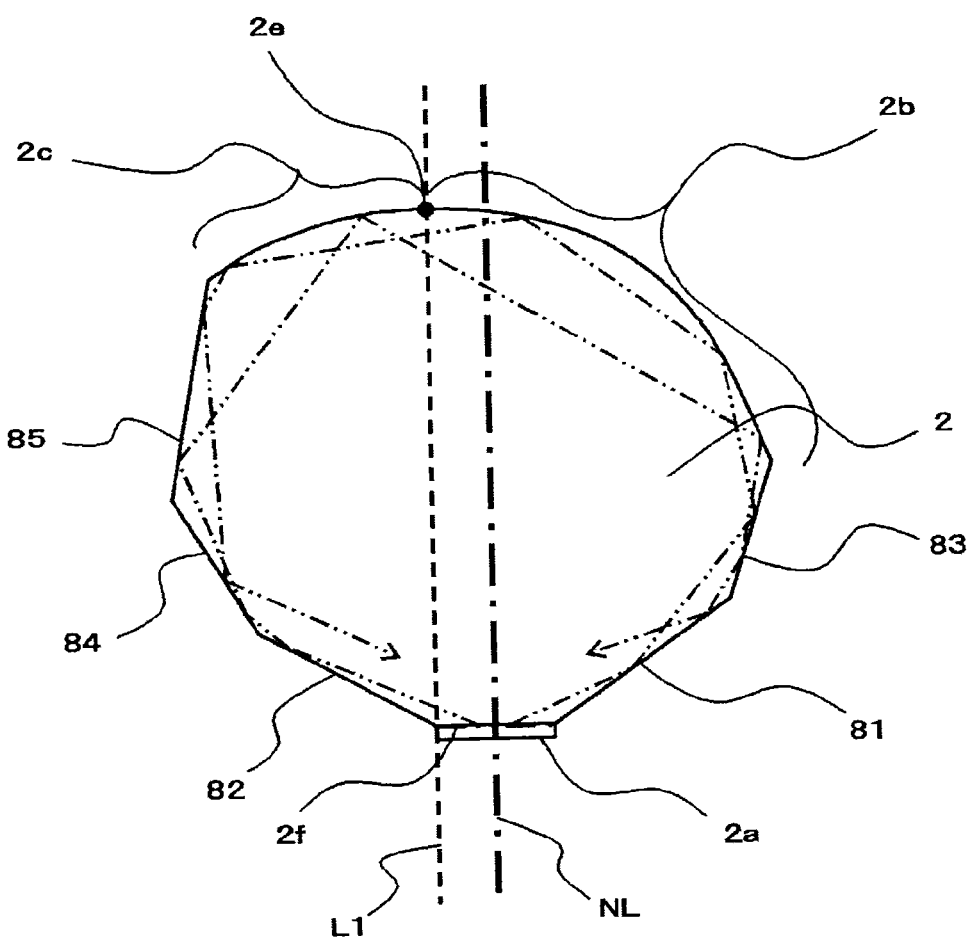
FIG. 18 is a cross sectional view taken along the transversal direction in a light guide according to Embodiment 3 of the present disclosure.
Figure 19:
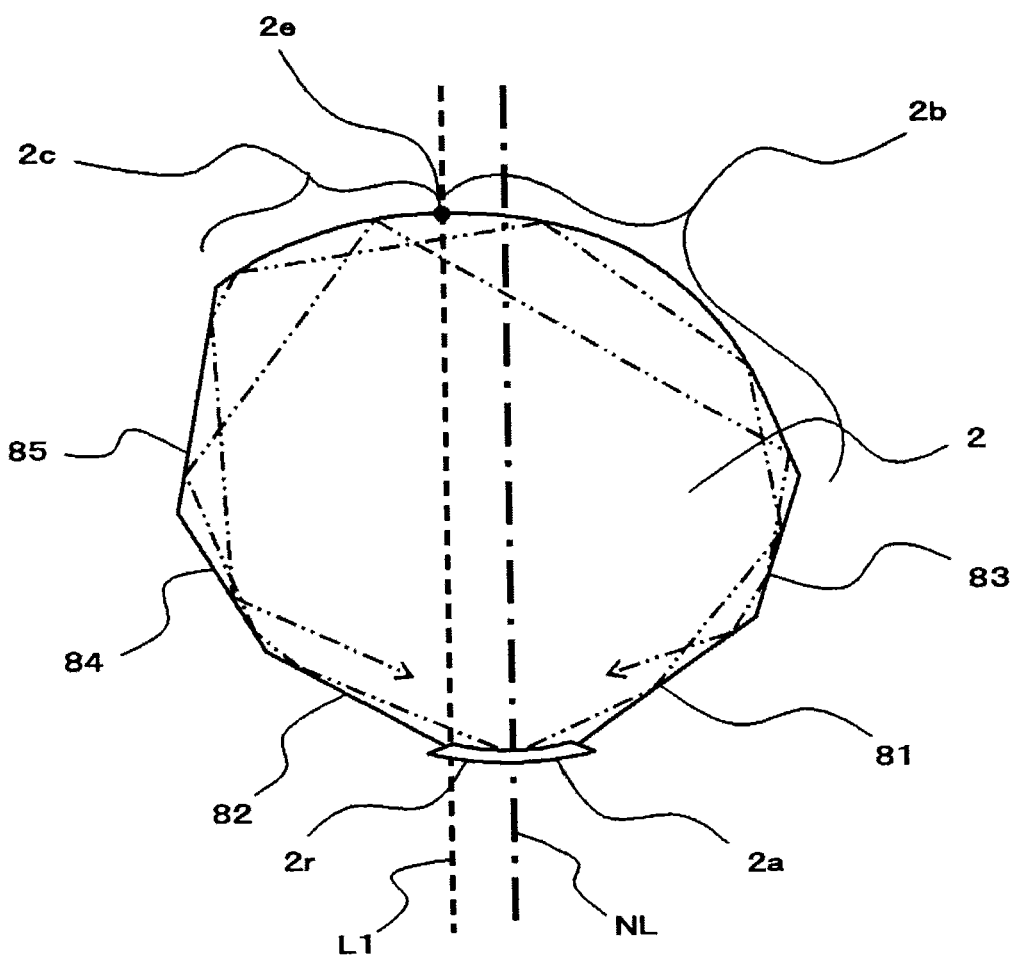
FIG. 19 is a cross sectional view taken along the transversal direction in a light guide according to Embodiment 3 of the present disclosure.
Figure 20:
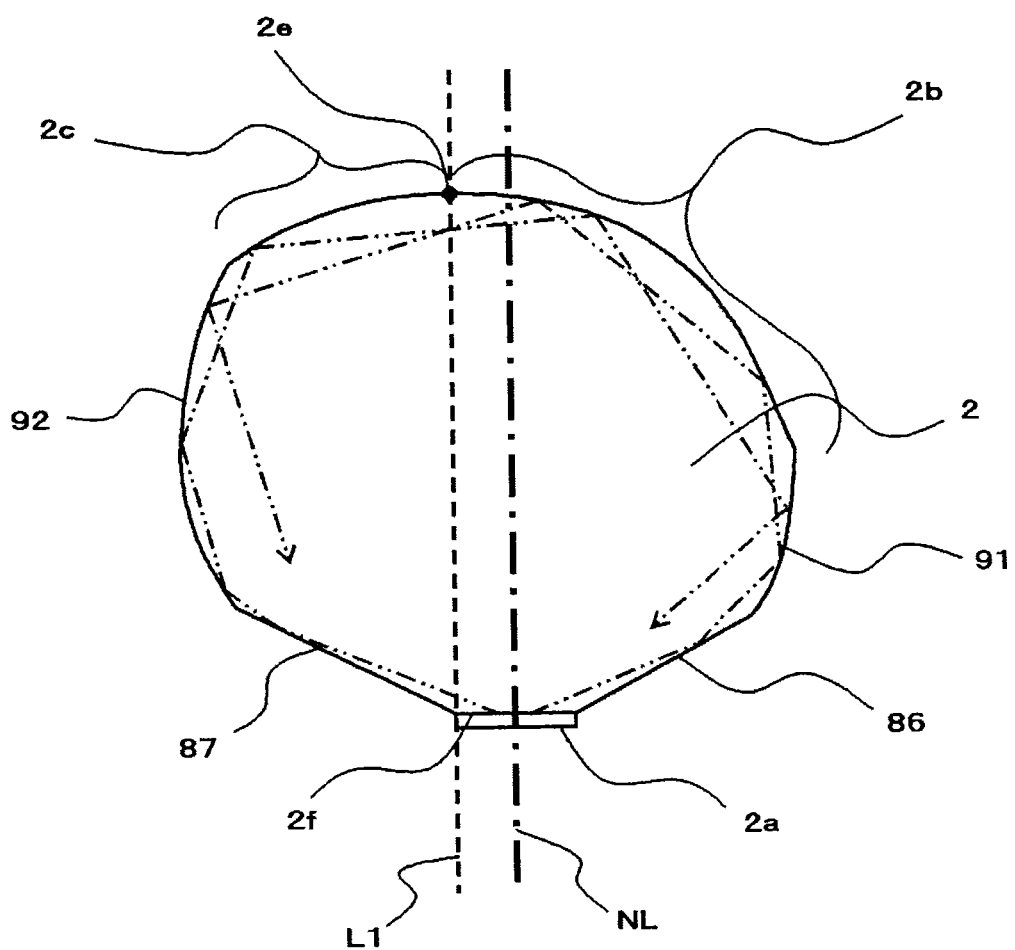
FIG. 20 is a cross sectional view taken along the transversal direction in a light guide according to Embodiment 3 of the present disclosure.
Figure 21:
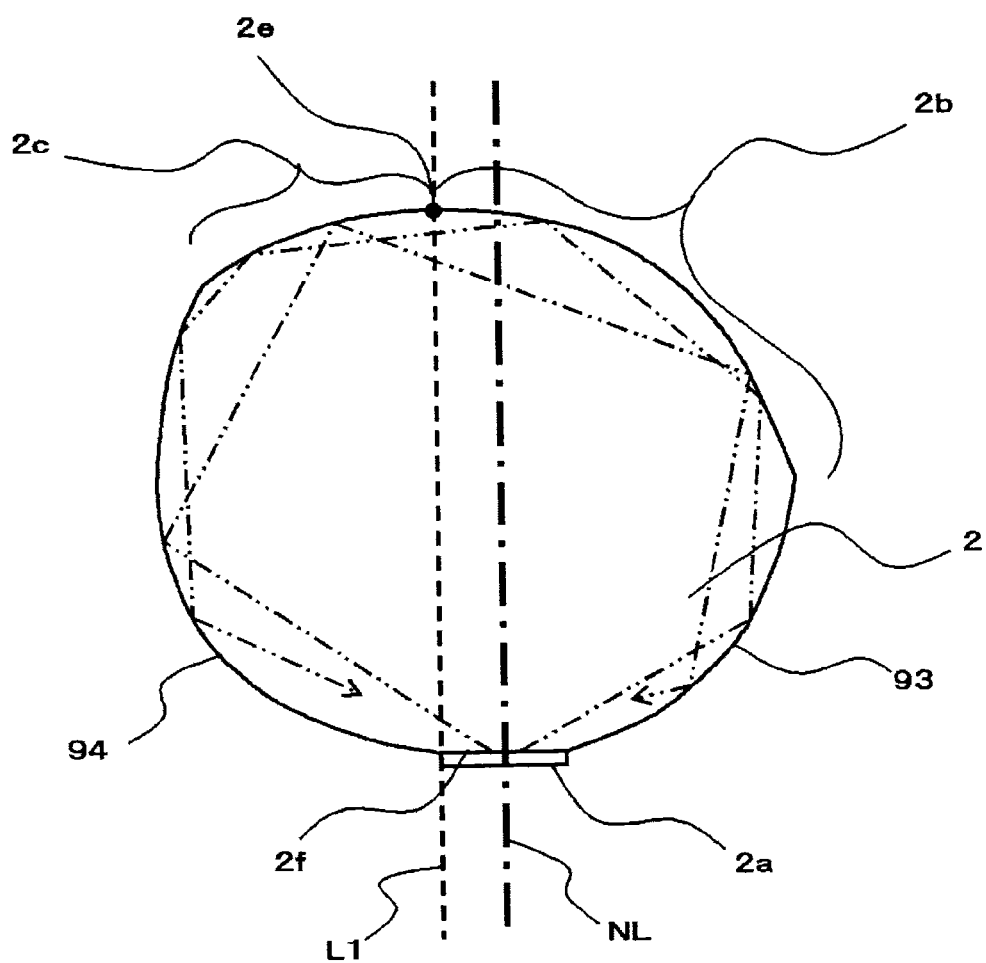
FIG. 21 is a cross sectional view taken along the transversal direction in a light guide according to Embodiment 3 of the present disclosure.

The light guide (light guide 2) according to Embodiment 3 is configured with a combination of a plurality of curved surfaces and planes. In the transversal cross section being the cross section along the transversal direction, neighboring planes except for the light scattering portion 2a, the first light emitting surface portion 2b, and the second light emitting surface portion 2c intersect at an angle of about 120° to 180°. The light guide 2 shown in FIG. 18 is configured with the first light emitting surface portion 2b, the second light emitting surface portion 2c, the planar portion 2f, a planar portion 81, a planar portion 82, a planar portion 83, a planar portion 84, and a planar portion 85. In the light guide 2 shown in FIG. 19, the planar portion 2f shown in FIG. 18 is replaced with the curved surface portion 2r. The light guide 2 shown in FIG. 20 is configured with the first light emitting surface portion 2b, the second light emitting surface portion 2c, the planar portion 2f, a planar portion 86, a planar portion 87, a curved surface portion 91, and a curved surface portion 92. The light guide 2 shown in FIG. 21 is configured with the first light emitting surface portion 2b, the second light emitting surface portion 2c, the planar portion 2f, a curved surface portion 93, and a planar portion 94. In the light guide 2 shown in FIG. 22, the planar portion 2f shown in FIG. 21 is replaced with the curved surface portion 2r.

Figure 22:
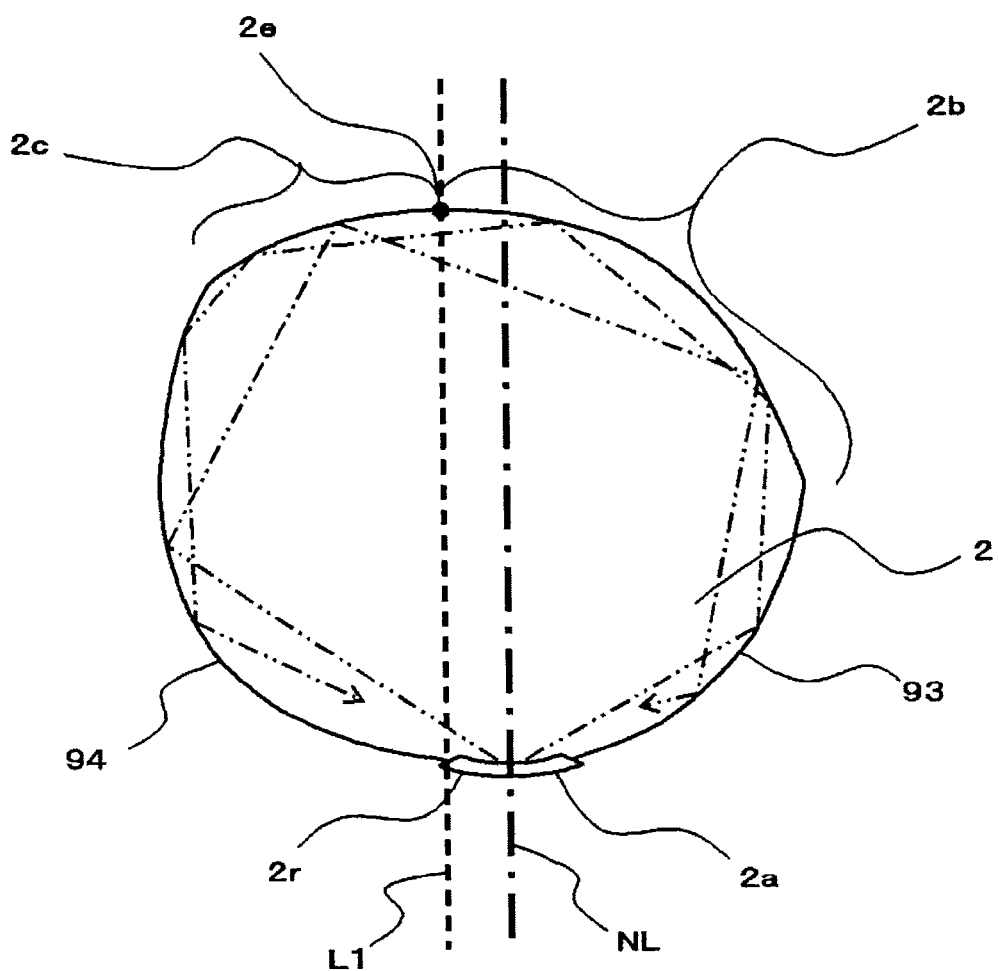
FIG. 22 is a cross sectional view taken along the transversal direction in a light guide according to Embodiment 3 of the present disclosure.

In the light guide 2 shown in FIG. 22, if the curved surface portion 93, the curved surface portion 94, and the curved surface portion 2r are smooth and continuous without unevenness, they are regarded as the curved surface portion 2r as a whole. In this case, it can be said that the shape is similar to that of the light guide shown in FIG. 8. Thus, the light guide 2 shown in FIG. 8 is recognized as the light guide (light guide 2) according to Embodiment 3. If the third planar portion 2h shown in FIG. 8 is replaced with the curved surface portion 92, the light guide 2 shown in FIG. 22 will be similar in shape to the light guide 2 shown in FIG. 8.

In the light guides 2 shown in FIGS. 18 to 22, the shapes of the planar portion 81, the planar portion 82, the planar portion 83, the planar portion 84, the planar portion 85, the planar portion 86, the planar portion 87, the curved surface portion 91, the curved surface portion 92, the curved surface portion 93, and the curved surface portion 94 in the transversal cross section being the cross section along the transversal direction are formed such that the light reflected by the light scattering portion 2a strikes the portions at an angle equal to or larger than a total reflection angle. Thereby, the light inside the light guide 2 repeats total reflection as shown by arrows indicated with the dashed-two dotted line in FIGS. 18 to 22, so that the light striking the light scattering portion 2a again is enhanced. Thus, the rate at which the light passes through the light guide 2, thereby not contributing to the illumination, is decreased and light use efficiency is improved.

The light guide (light guide 2) according to Embodiment 3 aims at reducing the light that does not contribute to the illumination. That is, the shape of the light guide 2 in the transversal cross section being the cross section along the transversal direction is made such that the light does not leak from the portions except for the first light emitting surface portion 2b and the second light emitting surface portion 2c that are configured as light emitting surface portions. Naturally, in the light guide (light guide 2) according to the present disclosure, the portion of the housing 9 on which the light guide 2 is placed in the image reading apparatus according to the present disclosure, may be formed in such a manner that the first light emitting surface portion 2b and the second light emitting surface portion 2c are only exposed when the light guide 2 is placed on the portion. That is, the portion may be formed so as to shield the light in the surface portions except for the first light emitting surface portion 2b and the second light emitting surface portion 2c, and thus the light does not leak from the portions except for the first light emitting surface portion 2b and the second light emitting surface portion 2c that are configured as light emitting surface portions.

EXPLANATION OF REFERENCE CHARACTERS 1 reading target
1a irradiated portion
2 light guide
2a light scattering portion
2b first light emitting surface portion (first curved surface)
2c second light emitting surface portion (second curved surface)
2d light emitting surface portion
2e inflection point (continuous point)
2f planar portion
2g second planar portion
2h third planar portion
2r curved surface portion
3 light source element (LED)
4 circuit board
5 holder
6 reflector
7 transparent plate (cover glass)
8 imaging optical system
9 housing
9a light shielding portion
11 sensor IC (optical receiver)
11od sensor IC (odd-numbered sensor IC)
11ev sensor IC (even-numbered sensor IC)
21 sensor board
22 sensor board
23 sensor board
24 signal processing board
31 curved surface mirror
32 curved surface mirror
33 curved surface mirror
34 curved surface mirror
35 planar mirror
36 planar mirror
37 aperture
38 aperture
41 external connector
42 connector for sensor signal
43 connector for sensor signal
51 signal processing IC
52 memory
61 optical path
71 fourth planar portion (horizontal planar portion)
72 fifth planar portion (vertical planar portion)
81 planar portion
82 planar portion
83 planar portion
84 planar portion
85 planar portion
86 planar portion
87 planar portion
91 curved surface portion
92 curved surface portion
93 curved surface portion 94 curved surface portion
101 light scattering prism

The invention claimed is:

1. A light guide extending along a longitudinal direction and having an arc-like outer shape portion at least in a part of a transversal cross section being a cross section along a transversal direction that intersects with the longitudinal direction, comprising:

a light scattering portion formed on a side surface of the light guide along the longitudinal direction and for reflecting light guided inside the light guide; and a light emitting surface portion including at least a part of the outer shape portion and formed on a side surface along the longitudinal direction located opposite to the light scattering portion, and for emitting light reflected by the light scattering portion to the outside of the light guide, wherein, the light emitting surface portion is configured with a first light emitting surface portion and a second light emitting surface portion that are connected continuously along a plurality of inflection points arranged along the longitudinal direction, the first light emitting surface portion has a longer circumferential length than that of the second light emitting surface portion in the transversal cross section, and a curvature of a circumference of the first light emitting surface portion in the transversal cross section becomes larger as getting away from the second light emitting surface portion to increase a region of uniform illuminance in the transversal direction on a reading target of light emitted by the first light emitting surface portion and the second light emitting surface portion; and a normal line to the light scattering portion, passing through a center of the light scattering portion in the transversal cross section, is arranged so as to intersect with the first light emitting surface portion, and a point where the normal line intersects with the first light emitting surface portion is arranged in the circumference of the first light emitting surface portion at a near side to the second light emitting surface portion in the transversal cross section, and the inflection points are closer, along the transversal direction, to the second light emitting surface portion than the point where the normal line intersects with the first light emitting surface portion.

2. The light guide according to claim 1, wherein the light scattering portion is formed on a planar portion being flat and provided in a side surface of the light guide along the longitudinal direction.

3. The light guide according to claim 2, wherein a second planar portion being flat and provided in a side surface of the light guide along the longitudinal direction is disposed between the planar portion and the first light emitting surface portion.

4. The light guide according to claim 2, wherein a third planar portion being flat and provided in a side surface of the light guide along the longitudinal direction is disposed between the planar portion and the second light emitting surface portion.

5. An image reading apparatus comprising:
the light guide according to claim 1;
an imaging optical system for converging reflected light, the reflected light being light emitted from the light guide and reflected by a reading target; and
an optical receiver for receiving light converged by the imaging optical system.

6. An image reading apparatus comprising:
at least two light guides according to claim 1, wherein a plurality of the light guides are disposed so that the normal lines intersect with each other in the transversal cross section, and a point at which the normal lines intersect with each other is arranged between a reading target and the light guides;
an imaging optical system for converging reflected light, the reflected light being light emitted from the light guide and reflected by the reading target; and
an optical receiver for receiving light converged by the imaging optical system.

* * * * *